(12) United States Patent
McGarry et al.

(10) Patent No.: US 9,411,613 B1
(45) Date of Patent: Aug. 9, 2016

(54) SYSTEMS AND METHODS FOR MANAGING EXECUTION OF SPECIALIZED PROCESSORS

(71) Applicant: Ryft Systems, Inc., Rockville, MD (US)

(72) Inventors: Patrick F. McGarry, Columbia, MD (US); David B. Sorber, Rockville, MD (US); Timothy P. Bresnan, Finksburg, MD (US); Andrew Huo, Rockville, MD (US)

(73) Assignee: Ryft Systems, Inc., Rockville, MD (US)

( * ) Notice: Subject to any disclaimer, the term of this patent is extended or adjusted under 35 U.S.C. 154(b) by 0 days.

(21) Appl. No.: 14/693,626

(22) Filed: Apr. 22, 2015

(51) Int. Cl.
*G06F 9/445* (2006.01)
*G06F 13/42* (2006.01)

(52) U.S. Cl.
CPC ........ *G06F 9/44505* (2013.01); *G06F 13/4221* (2013.01)

(58) Field of Classification Search
None
See application file for complete search history.

(56) References Cited

U.S. PATENT DOCUMENTS

| | | | |
|---|---|---|---|
| 6,029,166 A | 2/2000 | Mutalik et al. |
| 6,076,152 A | 6/2000 | Huppenthal et al. |
| 6,137,738 A | 10/2000 | Vorgert |
| 6,247,110 B1 | 6/2001 | Huppenthal et al. |
| 6,339,819 B1 | 1/2002 | Huppenthal et al. |
| 6,434,687 B1 | 8/2002 | Huppenthal |
| 6,681,354 B2 | 1/2004 | Gupta |
| 6,934,725 B1 | 8/2005 | Dings |
| 6,961,841 B2 | 11/2005 | Huppenthal et al. |
| 6,964,029 B2 | 11/2005 | Poznanovic et al. |
| 6,983,456 B2 | 1/2006 | Poznanovic et al. |
| 7,003,593 B2 | 2/2006 | Huppenthal et al. |
| 7,054,927 B2 | 5/2006 | Ulrich et al. |
| 7,134,120 B2 | 11/2006 | Hammes |
| 7,155,602 B2 | 12/2006 | Poznanovic |
| 7,155,708 B2 | 12/2006 | Hammes et al. |
| 7,167,976 B2 | 1/2007 | Poznanovic |
| 7,225,324 B2 | 5/2007 | Huppenthal et al. |
| 7,237,091 B2 | 6/2007 | Huppenthal et al. |
| 7,299,458 B2 | 11/2007 | Hammes |
| 7,310,759 B1 | 12/2007 | Carmichael et al. |
| 7,552,042 B1 | 6/2009 | Brebner et al. |
| 7,584,345 B2 | 9/2009 | Doering et al. |
| 7,603,540 B2 | 10/2009 | Doering et al. |
| 7,620,800 B2 | 11/2009 | Huppenthal et al. |
| 7,703,085 B2 | 4/2010 | Poznanovic et al. |
| 7,747,702 B2 | 6/2010 | Anderson et al. |
| 7,856,545 B2 | 12/2010 | Casselman |
| 7,873,961 B2 | 1/2011 | Miller et al. |
| 8,020,163 B2 | 9/2011 | Nollet et al. |

(Continued)

FOREIGN PATENT DOCUMENTS

| | | |
|---|---|---|
| CN | 201037908 Y | 3/2008 |
| CN | 101236488 A | 8/2008 |

(Continued)

OTHER PUBLICATIONS

U.S. Appl. No. 14/693,616, Systems and Methods for Performing Primitive Tasks Using Specialized Processors, Apr. 22, 2015.
U.S. Appl. No. 14/693,634, Store Management Systems and Methods, Apr. 22, 2015.
Bellows, P., et al., (Apr. 1998) "JHDL—An HDL for Reconfigurable Systems", In FPGAs for Custom Computing Machines, IEEE Symposium on, pp. 175-184.

(Continued)

*Primary Examiner* — Umut Onat
(74) *Attorney, Agent, or Firm* — Goodwin Procter LLP

(57) ABSTRACT

Specialized processors use configurable interconnection fabrics to manage execution of subtasks, that together define a task, using one or more specialized processors.

30 Claims, 12 Drawing Sheets

(56) References Cited

U.S. PATENT DOCUMENTS

| | | | |
|---|---|---|---|
| 8,436,644 | B2 | 5/2013 | Watanabe et al. |
| 8,468,301 | B2 | 6/2013 | Withers |
| 8,713,518 | B2 | 4/2014 | Pointer et al. |
| 8,863,065 | B1 | 10/2014 | Chow et al. |
| 8,930,892 | B2 | 1/2015 | Pointer et al. |
| 2001/0014937 | A1 | 8/2001 | Huppenthal et al. |
| 2003/0217306 | A1 | 11/2003 | Harthcock et al. |
| 2004/0049672 | A1 | 3/2004 | Nollet et al. |
| 2008/0095300 | A1 | 4/2008 | Zingelewicz et al. |
| 2010/0007662 | A1* | 1/2010 | Cox et al. ............ 345/420 |
| 2010/0174692 | A1* | 7/2010 | Meyer et al. .......... 707/696 |
| 2010/0218200 | A1 | 8/2010 | Lutterkort |
| 2011/0197256 | A1 | 8/2011 | Sharkey et al. |
| 2011/0296133 | A1 | 12/2011 | Flynn et al. |
| 2012/0151094 | A1 | 6/2012 | Cooke |
| 2013/0073519 | A1 | 3/2013 | Lewis et al. |
| 2013/0080732 | A1 | 3/2013 | Nellans et al. |
| 2013/0227236 | A1 | 8/2013 | Flynn et al. |
| 2013/0254477 | A1 | 9/2013 | Swanson et al. |
| 2013/0343379 | A1 | 12/2013 | Stroud et al. |
| 2013/0346669 | A1 | 12/2013 | Nightingale et al. |
| 2013/0346759 | A1 | 12/2013 | LaMacchia et al. |
| 2013/0346985 | A1 | 12/2013 | Nightingale |
| 2014/0122762 | A1 | 5/2014 | Yu et al. |
| 2014/0169133 | A1 | 6/2014 | Nemeth et al. |
| 2014/0237284 | A1 | 8/2014 | Fine et al. |
| 2014/0241346 | A1* | 8/2014 | Cohn et al. ........... 370/389 |
| 2014/0244766 | A1 | 8/2014 | Mo et al. |

FOREIGN PATENT DOCUMENTS

| | | |
|---|---|---|
| CN | 201247471 Y | 5/2009 |
| CN | 100530009 C | 8/2009 |
| CN | 201353157 Y | 12/2009 |
| CN | 101826038 A | 9/2010 |
| CN | 101883217 A | 11/2010 |
| CN | 201698002 U | 1/2011 |
| CN | 102184158 A | 9/2011 |
| CN | 102436840 A | 5/2012 |
| CN | 102710424 A | 10/2012 |
| CN | 102779079 A | 11/2012 |
| CN | 102799561 A | 11/2012 |
| CN | 103176945 A | 6/2013 |
| CN | 203435089 U | 2/2014 |
| CN | 103612287 A | 3/2014 |
| CN | 103744713 A | 4/2014 |
| CN | 203705861 U | 7/2014 |
| IE | S20070144 A2 | 11/2007 |
| JP | 3199343 B2 | 8/2001 |
| JP | 3900499 B2 | 4/2007 |
| KR | 100606362 B1 | 7/2006 |

OTHER PUBLICATIONS

Compton, K., et al., (Apr. 2000) "An Introduction to Reconfigurable Computing", *IEEE Computer*, (9 pages).

Compton, K., et al., (Jun. 2002) "Reconfigurable computing: a survey of systems and software", *ACM Computing Surveys*, 34(2), pp. 171-210.

Danne, K., (2004) "Operating systems for fpga based computers and their memory management." *ARCS Organic and Pervasive Computing*, Workshop Proceedings, vol. 41, (10 pages).

Donthi, S., et al., (Mar. 2003) "A Survey of Dynamically Reconfigurable FPGA Devices", In System Theory, Proceedings of the 35th Southeastern Symposium on, IEEE, pp. 422-426.

Ekas, P., et al., (2003), "Developing and Integrating FPGA Coprocessors", *Embedded Computer Design*, (6 pages).

Herbordt, M., et al., (Mar. 2007) "Achieving High Performance with FPGA-based Computing", *Computer*, 40(3), pp. 50-57.

Hill, T., (Jul. 14, 2011) "Advancing the Use of FPGA Co-Processors Through Platforms and High-Level Design Flows", *Xilinx White Paper*, pp. 1-14.

James-Roxby, P., et al., (2000) "Automated Extraction of Rrun-Time Parameterisable Cores from Programmable Device Configurations", In Field-Programmable Custom Computing Machines, IEEE Symposium on, pp. 153-161.

Jean, J. S., et al., (2001) "Query Processing with an FPGA Coprocessor Board", (7 pages).

Jozwik, K., et al., (2013) "Rainbow: An Operating System for Software-Hardware Multitasking on Dynamically Partially Reconfigurable FPGAs", *International Journal of Reconfigurable Computing*, vol. 2013, (36 pages).

Kuon, I., et al., (Feb. 2005) "Design, Layout and Verification of an FPGA Using Automated Tools", In Proceedings of the 2005 ACM/SIGDA 13th International Symposium on Field-Programmable Gate Arrays, ACM, pp. 215-226.

Microsemi Corporation, (2013) "SmartFusion cSoC: DSP Coprocessor in FPGA Fabric", Application Note AC355, (9 pages).

Soliman, M. I., et al., (2010) "FastCrypto: Parallel AES Pipelines Extension for General-Purpose Processors", *Neural, Parallel & Scientific Computations*, 18(1), pp. 47-58.

Villasenor, J., et al., (1997) "Configurable Computing", *Scientific American*, 276(6), (9 pages).

Walder, H., et al., (Jun. 2003) "Reconfigurable Hardware Operating Systems: From Design Concepts to Realizations", *In Engineering of Reconfigurable Systems and Algorithms*, pp. 284-287.

Matoga, A., et al., "An FPGA based Accelerator for Encrypted File Systems", 8th International Summer School on Advanced Computer Architecture and Compilation for High-Performance and Embedded Systems (ACACES), HiPEAC, Jul. 2012 (4 pages).

\* cited by examiner

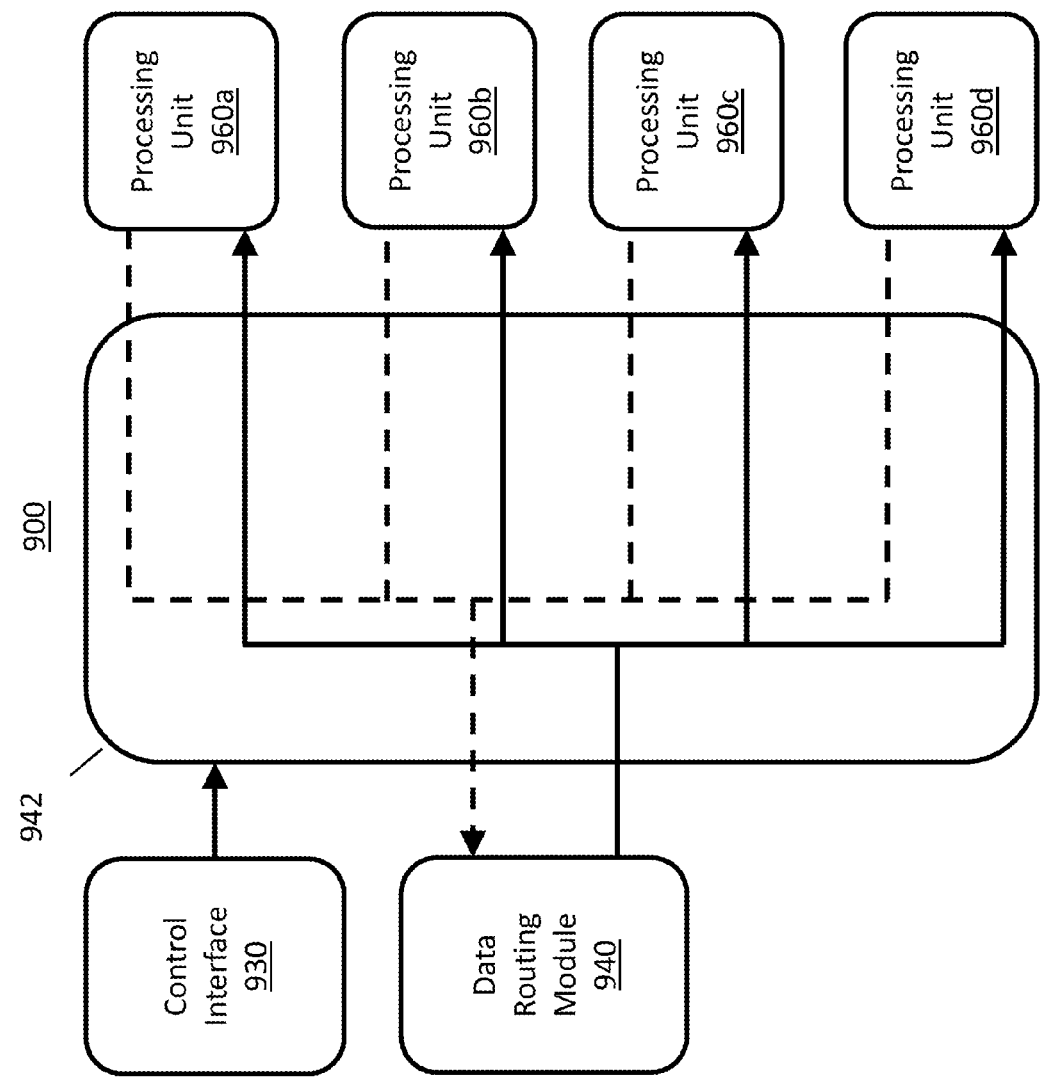

SYSTEMS AND METHODS FOR MANAGING EXECUTION OF SPECIALIZED PROCESSORS

FIELD OF INVENTION

In various embodiments, this disclosure relates generally to computation of tasks on specialized processors, and, in particular, to managing execution of tasks on different processing units of specialized processors.

BACKGROUND

In developing a software application, a developer typically writes or provides only a portion of the entire software application. Other portions of the software application are commonly obtained from a third-party library, such as a library supplied with a compiler/interpreter, an open-source library, and/or a proprietary library provided by a vendor. The application developer may use an application program interface (API), usually provided by the third party, to access functionality available in the third-party library.

A third-party library may be available in source code form and/or object code form. If the source code is available, a compiler/interpreter is typically used to compile the source code written by the developer along with one or more APIs and the source code of the corresponding functionality. Usually in this case, a binary or an executable is generated for one or more general purpose processors. If the third-party library is available only in the object code form, such library can be linked with the object code obtained by compiling the source code supplied by the application developer, to obtain an executable file. This is generally feasible if the two object code modules are compatible, i.e., if the two object code modules are generated for the same types of processors.

Some computer systems employ specialized processing modules that may include application specific integrated circuits (ASICs), reconfigurable processing units (e.g., field programmable gate array (FPGA) processing units), etc., for executing the software applications or, more commonly, certain portions thereof. Such specialized processing modules can be faster and/or more efficient than general purpose processors and, as such, after often used to execute computationally intensive tasks and/or tasks that manipulate large amounts of data (e.g., tens or hundreds of megabytes, gigabytes, terabytes, or even larger sizes of data). The tasks to be executed using a specialized processing module may be 81206052.9 distinguished from other tasks that are to be executed by a general purpose processor using compiler directives. Typically, a general purpose processor (also called central processing unit (CPU)) is in charge of executing the software application. When the CPU determines that a particular task is designated to a specialized processor, the CPU requests the specialized processor to execute the task. The CPU also supplies the data required for the execution of the task to the specialized processor, and retrieves results therefrom, for further processing. The CPU generally reads data from a storage module, writes data thereto, and exchanges data as needed with the specialized processing module. The CPU also generally manages any data exchange between two or more tasks assigned to the specialized processor(s).

Many computers use file management software to access data stored in files stored on storage devices (e.g., hard disc drives (HDDs), solid state drives (SSDs), etc.). The file management software manages requests by applications to open and close files, create and delete files, read data from files, write data to files, etc. To perform these and other file management operations, the file management software may maintain file system records indicating one or more locations in a storage device where a file or parts thereof are stored. When an application requests access to a file or a particular portion thereof, the file management software uses these file system records to determine the address of the requested data on the storage device, transmits the appropriate signals to the storage device to obtain the requested data, and passes the requested data to the application. In various computer systems, the file management operations are typically performed by an operating system running on a general-purpose, programmable processing device (e.g., a central processing unit ("CPU")).

Computer systems generally access data from one or more files during the execution of software applications such as applications for audio/video processing, financial transactions, data mining, etc. The CPU that performs the file management operations may additionally execute one or more software applications, or a computer system may include additional processors for executing the software applications.

As described above, the ASICs and/or reconfigurable (e.g., FPGA-based) processing units generally rely on conventional file management software executed by the CPU for accessing data in files stored on storage devices. Therefore, computer systems that include specialized processors typically include a general purpose CPU which executes an operating system with conventional file management software. Generally in such systems, the CPU uses the conventional file management software to obtain data from a storage device on behalf of a specialized processor and may store the data in a memory that is directly accessible to the specialized processor or may supply the data directly thereto. Likewise, after the specialized processor computes a result, the result may be stored in the memory directly accessible to the specialized processor for retrieval by the CPU or may be sent directly to the CPU. The CPU then uses the conventional file management software to store the result in a file stored on the storage device.

SUMMARY OF THE INVENTION

General-purpose processors are generally capable of performing complex control flow operations efficiently, and specialized processors are generally capable of performing at least some types of data processing tasks quickly and/or efficiently. Thus, some computer systems use general-purpose processors to manage control/data flow associated with various tasks, including computational tasks, and use specialized processors to implement data processing tasks. However, communication and synchronization between specialized processors and general-purpose processors can be time-consuming and inefficient, particularly when the general-purpose processor must load data generated by the specialized processor to evaluate a control flow expression and/or must supply data needed by the specialized processor for processing of such data. When data/control flow operations are embedded within or between specialized-processor-based tasks, relying on a general-purpose processor to implement those control flow operations can create a significant performance bottleneck. Thus, techniques for implementing control flow operations in specialized processors are needed.

The present disclosure describes primitive chaining, a technique which may improve the execution of various primitive-related operations by a specialized processor (e.g., by one or more specialized processing units in such a processor), thereby enhancing the performance of computing systems having specialized processors. Primitive chaining refers to using specialized processors not only to perform primitive tasks, but also to manage control and/or data flow between or among subtasks associated with a primitive. In some embodiments, specialized processors may configure several specialized processing units for parallel, sequential, partially parallel partially sequential, and/or conditional execution of the subtasks of a primitive. Generally, the specialized processor includes a reconfigurable interconnect.

Accordingly, in one aspect a method of configuring one or more field programmable gate array (FPGA) modules for executing a primitive is provided. The method comprises receiving at an FPGA-based controller an identifier of a primitive, and configuring, by the FPGA-based controller, first and second FPGA units and an interconnect. The first FPGA unit is configured for executing a first subprimitive related to the primitive. The second FPGA unit is configured for executing a second subprimitive related to the primitive. The interconnect is configured to coordinate the execution of the first subprimitive and the second subprimitive.

In some embodiments, executing the first subprimitive includes accessing a first data element, and executing the second subprimitive includes accessing a second data element different from the first data element. In some embodiments, the second subprimitive comprises the first subprimitive. In some embodiments, the first data element is local to the first FPGA unit, and the second data element is local to the second FPGA unit.

In some embodiments, the first and the second FPGA units are configured to execute, at least partially in parallel, the first subprimitive and the second subprimitive. In some embodiments, the first FPGA unit and the second FPGA unit are configured to sequentially execute the first subprimitive and the second subprimitive.

In some embodiments, the first FPGA unit is configured for using a first data element to generate an intermediate result, and the second FPGA unit is configured for executing the second subprimitive using a second data element and/or the intermediate result. In some embodiments, the method includes providing an FPGA-based storage node manager configured to store the intermediate result in a storage module and to read the intermediate result from the storage module. The first and second FPGA units may be configured to access the intermediate result via the FPGA-based storage node manager.

In some embodiments, the method includes the FPGA-based controller configuring a third FPGA unit to execute a third subprimitive related to the primitive. The third subprimitive may be executing using a third data element. In some embodiments, the configuration of the third FPGA unit by the FPGA-based controller is based on, at least in part, a size of data associated with the primitive. In some embodiments, the first FPGA unit is configured for generating an intermediate result, and the method includes the FPGA-based controller configuring activation of either the second FPGA unit or the third FPGA unit, based, at least in part, on the intermediate result.

In some embodiments, the one or more FPGA modules comprise a first FPGA module which includes the first FPGA unit and a second FPGA module including the second FPGA unit. In some embodiments, the one or more FPGA modules comprise a first FPGA module which includes a first FPGA processor and a second FPGA processor. The first FPGA processor may include the first FPGA unit, and the second FPGA processor may include the second FPGA unit. In some embodiments, the one or more FPGA modules comprise a first FPGA processor which includes the first FPGA unit and the second FPGA unit.

The first and second FPGA units may be included in a group of several FPGA units, and a first set of subprimitives related to the specified primitive may include subprimitives that can be respectively associated with each one of the several FPGA units. The first set of subprimitives may include the first subprimitive and the second subprimitive. As such, in some embodiments, the method includes further configuring by the FPGA-based controller: (i) all of the several FPGA units to execute a respective subprimitive selected from the first set of subprimitives such that the first FPGA unit is configured to execute the first subprimitive and the second FPGA unit is configured to execute the second subprimitive. The method may also include configuring by the FPGA-based controller the interconnect to coordinate the execution of all of the subprimitives of the first set in parallel, sequential, and/or conditional manner. In addition, the method may include reconfiguring all of the several FPGA units to execute a respective subprimitive selected from a second set of subprimitives related to the primitive, and reconfiguring the interconnect to coordinate the execution of all of the subprimitives from the second set of subprimitives in parallel, sequential, and/or conditional manner.

In some embodiments, an intermediate subprimitive may be related to the primitive, and the method may further include deriving by the FPGA-based controller the first and second subprimitives from the intermediate subprimitive, based on one or more primitive parameters and/or one or more system parameters.

According to another aspect of the present disclosure, a system for executing a primitive is provided. The system comprises first and second FPGA units, an interconnect, and an FPGA-based controller. The FPGA-based controller is configured to receive an identifier of a primitive, configure the first FPGA unit to execute a first subprimitive related to the primitive, configure the second FPGA unit to execute a second subprimitive related to the primitive, and configure an interconnect to coordinate execution of the first subprimitive and the second subprimitive.

In some embodiments, executing the first subprimitive includes the first FPGA unit accessing a first data element, and executing the second subprimitive includes the second FPGA unit accessing a second data element different from the first data element. In some embodiments, the second subprimitive comprises the first subprimitive. In some embodiments, the first data element is local to the first FPGA unit, and the second data element is local to the second FPGA unit.

In some embodiments, the first and the second FPGA units are configured to execute, at least partially in parallel, the first subprimitive and the second subprimitive. In some embodiments, the first FPGA unit and the second FPGA unit are configured to sequentially execute the first subprimitive and the second subprimitive.

In some embodiments, the first FPGA unit is configured to use a first data element to generate an intermediate result, and the second FPGA unit is configured to execute the second subprimitive using at least one of a second data element and the intermediate result. In some embodiments, the system includes an FPGA-based storage node manager configured to store the intermediate result in a storage module and to read the intermediate result from the storage module. The first and second FPGA units may be configured to access the intermediate result via the FPGA-based storage node manager.

In some embodiments, the FPGA-based controller is further configured to configure a third FPGA unit to execute, using a third data element, a third subprimitive related to the primitive. In some embodiments, the configuration of the third FPGA unit by the FPGA-based controller is based, at least in part, on a size of data associated with the primitive. In some embodiments, the first FPGA unit is configured to generate an intermediate result, and the FPGA-based controller is configured to control activation of either the second FPGA unit or the third FPGA unit, based on, at least in part, the intermediate result. In various embodiments, the FPGA-based controller can configure any number of FPGA units (e.g., 4, 6, 8, 10, 12, 20, or more units) for executing corresponding subprimitives. The FPGA units may be interconnected (also called chained) in parallel, in sequence, or based on one or more conditions, to execute the respective subprimitives. The interconnection may include a combination of any two or all three of parallel, sequential, and conditional interconnections. Moreover, in some embodiments, the FPGA-based controller may re-configure one or more FPGA units to execute a different subprimitive and may also modify the interconnection between such FPGA units.

The system may include a number of FPGA units, including the first and second FPGA units. A first set of subprimitives related to the primitive may include respective subprimitives that can be associated with each one of the several FPGA units. The first set of subprimitives may include the first subprimitive and the second subprimitive. A second set of subprimitives may also be related to the primitive. As such, in some embodiments, the FPGA-based controller is further configured to configure all of the several FPGA units to execute a respective subprimitive selected from the first set of subprimitives such that the first FPGA unit is configured to execute the first subprimitive and the second FPGA unit is configured to execute the second subprimitive. The FPGA-based controller may also be adapted to configure the interconnect to coordinate the execution of all of the subprimitives of the first set in parallel, sequential, and/or conditional manner. In addition, the FPGA-based controller may reconfigure the several FPGA units to execute a respective subprimitive selected from the second set of subprimitives, and may reconfigure the interconnect to coordinate the execution of all of the subprimitives of the second set of subprimitives in parallel, sequential, and/or conditional manner.

An intermediate subprimitive may be related to the primitive, and the FPGA-based controller may be further configured to derive the first and second subprimitives from the intermediate subprimitive, based on one or more primitive parameters and/or one or more system parameters.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10%, and in some embodiments ±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 9B is a block diagram of a reconfigurable bus fabric configured to facilitate parallel execution of primitives by a specialized processor, in accordance with some embodiments;

DETAILED DESCRIPTION

A Reconfigurable Computing System

Figure 1:
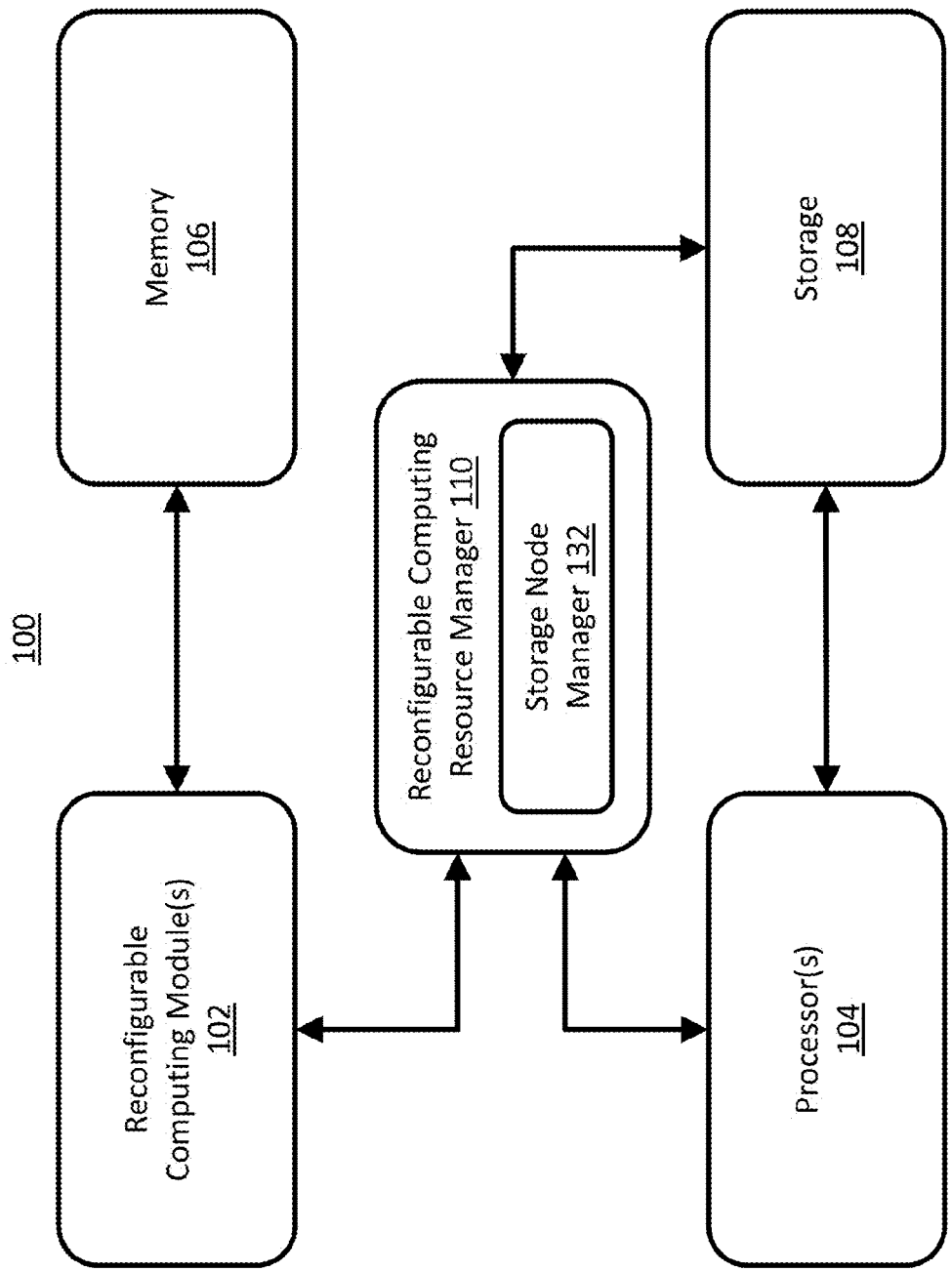
FIG. 1 is a block diagram of a reconfigurable computing system in accordance with some embodiments.

Referring to FIG. 1, in some embodiments a reconfigurable computing system 100 includes one or more reconfigurable computing modules (RCMs) 102, memory 106, storage 108 (e.g., a storage module including one or more storage nodes), one or more processors/CPUs 104, and a reconfigurable computing resource manager 110, which includes a storage node manager 132. The reconfigurable computing module(s) may be reconfigurable, at least in part, to perform different operations in hardware. In some embodiments, an RCM may include at least one programmable logic device (e.g., a generic array logic device (GAL), a complex programmable logic device (CPLD), a field-programmable gate array (FPGA), etc.) and/or any other suitable reconfigurable hardware (e.g., logic fabric and/or interconnection fabric that can be reconfigured to perform different operations). As used herein, "fabric" generally means circuitry (e.g., reconfigurable circuitry) for computations and/or data movement.

Compared to general purpose processors, the RCM(s) can provide relatively high performance and/or may consume less power for specialized tasks. In some embodiments, an RCM and its interconnects may be configured to operate at relatively low clock frequencies, e.g., at tens or hundreds of MHz and not at a few GHz, and therefore may require relatively less power. The relatively slow clock speed, however, usually does not adversely affect the system performance, in part because, in some embodiments, an RCM and its interconnects exhibit massive bitwise parallelism. For example, the data paths through the RCM may be tens, hundreds, or even thousands of bits wide. Additionally or in the alternative, the RCMs may operate in parallel, i.e., different RCMs may perform the same or different operations in parallel. The combination of high parallelism and low clock speeds can yield a high performance/power ratio.

The RCM(s) 102 may be coupled to memory 106. Memory 106 may include volatile, read-write memory. In some embodiments, memory 106 may include, without limitation, random access memory (RAM), dynamic RAM (DRAM), static RAM (SRAM), and/or any other suitable type of memory. In some embodiments, memory 106 may be dedicated to RCM(s) 102 (e.g., memory 106 may be accessible to RCM(s) 102, and may be inaccessible to processor(s) 104). The memory 106 may also include several memory modules and a particular memory module or a particular group of memory modules may be associated with a particular RCM. Different RCM(s) can be configured to perform the same or different tasks and a particular RCM may be configured to perform different tasks at different times during the execution of a data processing procedure involving those tasks. Examples of suitable tasks/subtasks include searching (e.g., fuzzy searching, pipelined sliding window searching, or any other suitable searching task), counting (e.g., determining term frequency in a data set, determining a document's word count, etc.), sorting, data compression, data encryption, image processing, video processing, speech/audio processing, statistical analysis, solution of complex systems involving matrices and tensors, etc.

Storage 108 may include non-volatile, read-write memory. In some embodiments, storage 108 includes, without limitation, one or more of flash memory, ferroelectric RAM (F-RAM), magnetic storage (e.g., hard disk), magnetoresistive RAM (MRAM), non-volatile RAM (NVRAM), and/or one or more solid-state drives (SSDs). The storage 108 is generally accessible to the RCM(s) 102 via the reconfigurable computing resource manager 110, and may be accessible to the processor(s) 104, as well. The storage 108 may include several (e.g., 2, 4, 6, 10, 12, 16, 20, 32, 48, 64, etc.) components or nodes. A particular storage node or a particular group of storage nodes may be associated with a particular RCM 102 at a certain time and with another RCM 102 at a different time. The association between an RCM and one or more storages nodes can change from computation of one task to another and/or between the execution of a pair of subtasks from a set of two or more subtasks associated with a particular task. In some embodiments, storage 108 or nodes thereof are swappable (e.g., hot swappable).

The processor(s) 104 may include one or more processing devices. In some embodiments, processor(s) 104 may include, without limitation, one or more central processing units (CPUs), graphics processing units (GPUs), network processors (NPs), physics processing units (PPUs), microprocessors, microcontrollers, application-specific integrated circuits (ASICs), application-specific instruction-set processors (ASIPs), digital signal processors (DSPs), and/or multi-core processors. In some embodiments, the processor(s) 104 may be programmed to execute an operating system (e.g., WINDOWS® operating system, LINUX® operating system, OS X operating system). The processor(s) 104 may be programmed to access data from the file(s) stored on the storage 108 through the reconfigurable computing resource manager 110. In some embodiments, the processor(s) 104 may communicate with the RCM(s) 102 through reconfigurable computing resource manager 110 and/or through a bus. In some embodiments, the processor(s) 104 can access the memory 106 and/or the storage nodes of the storage 108.

Figure 4:
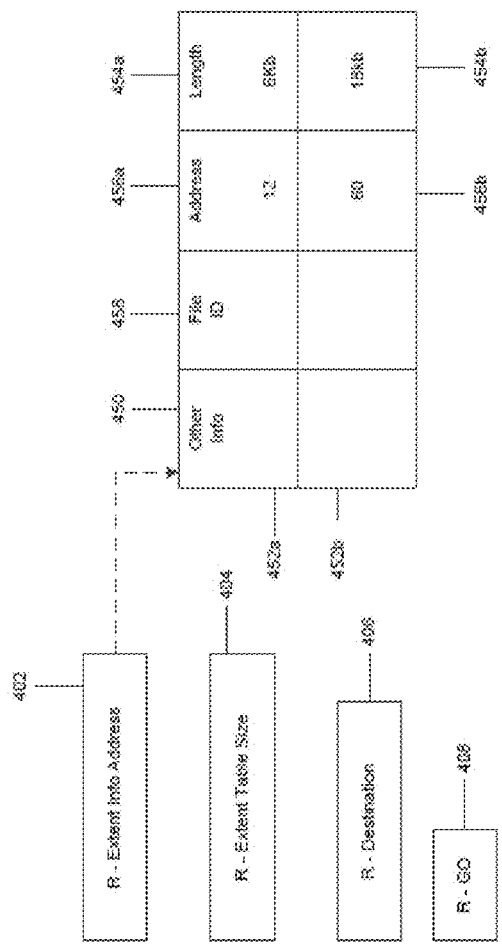
FIG. 4 schematically depicts extent-based information maintained by a hardware-based storage manager for a storage module including two or more storage nodes, according to one embodiment.
Figure 4:
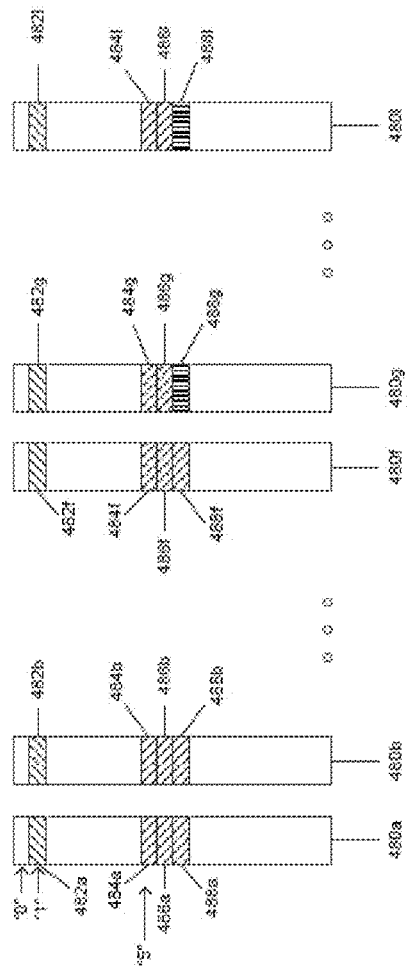

Reconfigurable computing resource manager 110 may be configured to manage one or more resources of reconfigurable computing system 100, including, without limitation, storage 108, RCM(s) 102, input/output (I/O) adapters (not shown), network transceivers (not shown), and/or routing resources among the components of system 100. In addition, the resource manager 110 includes a storage node manager 132 that can manage the storage 108 and/or the nodes thereof, if the storage 108 includes storage nodes. To this end, the storage node manager 132 obtains certain selected portions of the file system information (e.g., extent information) from the processor(s) 104 and/or the operating system executing thereon. The selected portions of the file system information may include a set of starting sectors of file fragments and a corresponding set of contiguous sizes of the file fragments. Using the selected portions of the file system information, the storage node manager 132 can facilitate exchange of data associated with a file between the storage 108 and the memory 106 and/or one or more RCMs 102, without any intervention during the data exchange (i.e., reading data from a file and modifying/writing data to a file), by the processor(s) 104 and/or any operating system executing thereon. In some embodiments, the storage node manager 132 may further control the routing of data between the RCM(s) 102 and the storage 108, and/or between the memory 106 and the storage 108. As described below with reference to FIG. 4, the storage node manager may facilitate exchange of data between the storage 108 and the RCM(s) 102, the processor(s) 104, and/or the memory 106.

In some embodiments, resource manager 110 includes a reconfiguration controller that can configure one or more of the RCMs 102 to perform a specified task. In some embodiments, the reconfiguration controller may initiate reconfiguration of one or more RCMs 102 without the intervention of processor(s) 104 (e.g., in response to detecting suitable conditions). In some embodiments, resource manager 110 includes a communications manager configured to manage the I/O resources (not shown) and/or networking resources (not shown) of system 100. In some embodiments, the I/O manager may manage, without limitation, a display adapter, an audio adapter, a network transceiver, and/or any other suitable I/O or network resource. In some embodiments, the RCM(s) 102 may be configured to use the system's communications resources through the communication manager, without relying on any of the processor(s) 104 and/or the operating system executing thereon. The processor(s) 104 may also access the system's communications resources through the operating system.

Figure 2:
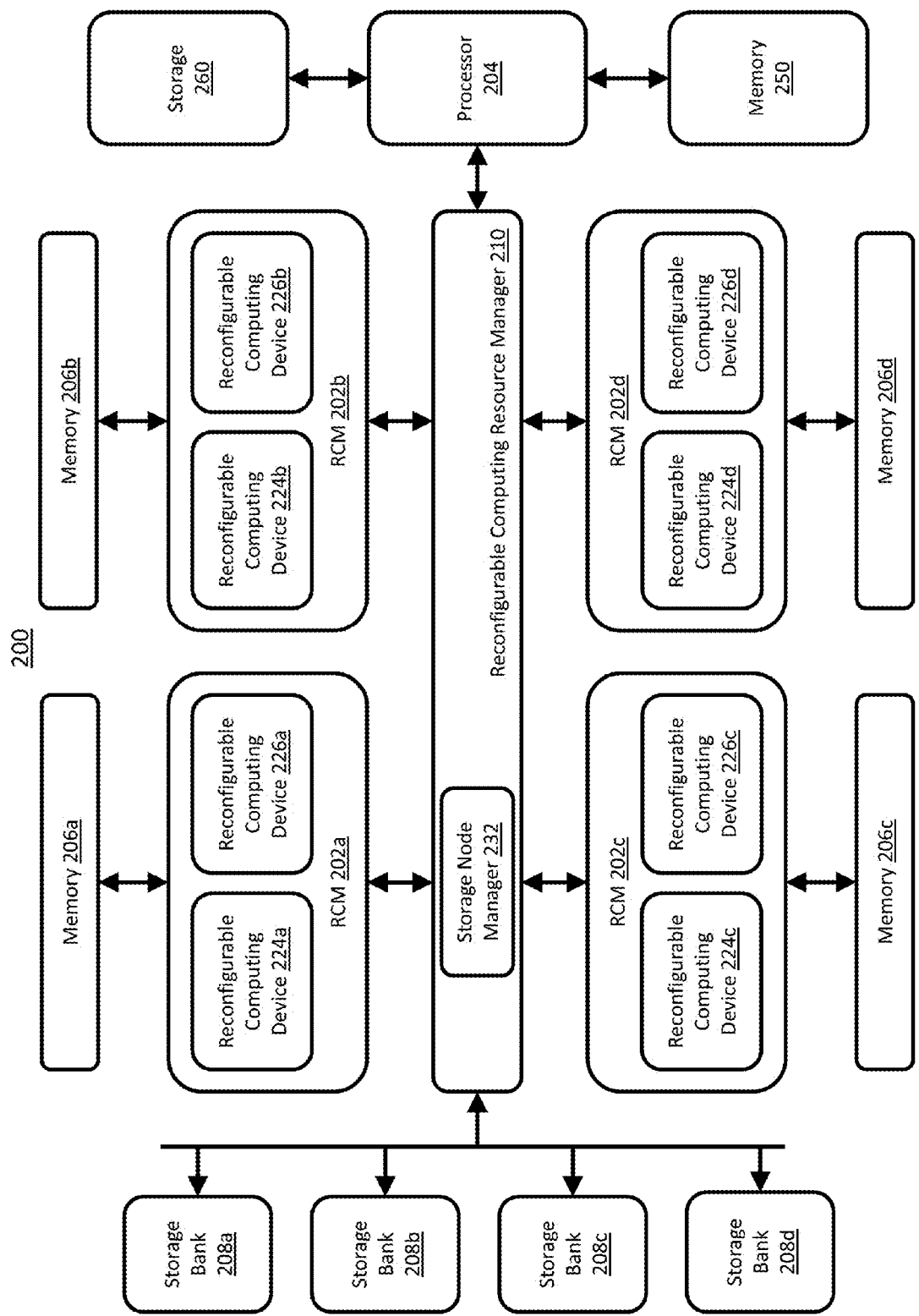
FIG. 2 is an architectural illustration of a reconfigurable computing system in accordance with some embodiments.

In some embodiments, the components of a reconfigurable computing system 200 are arranged according to an architecture shown in FIG. 2. The reconfigurable computing system includes four reconfigurable computing modules (RCMs) 202 coupled to respective memories 206 and to a reconfigurable computing resource manager 210. The resource manager 210 is coupled to one or more storage banks 208 (e.g., one, two, four, six, eight, or more than eight storage banks) and to a processor 204, which is coupled to memory 250 and storage 260.

Each RCM 202 includes two reconfigurable computing devices 224 and 226. The reconfigurable computing devices may operate in parallel (e.g., may perform the same operations or different operations in parallel), and/or may be configured to perform bitwise parallel operations. Typically, each reconfigurable computing device includes one or more reconfigurable modules (e.g., FPGA units).

A memory 206 may include any suitable type of memory device arranged in any suitable configuration. In some embodiments, a memory 206 may include tens, hundreds, or thousands of gigabytes (GB) of RAM, arranged in any suitable number of memory modules and/or banks.

Each storage bank 208 can include one or more storage nodes of the same or different types, such as conventional disk drives, optical drives, etc. In one embodiment, the storage nodes in a storage bank are solid-state drives (SSDs) such as mSATA SSDs or M.2 SSDs. In some embodiments, a storage bank may accommodate swapping (e.g., hot swapping) of SSDs having different form factors. For example, a storage bank may allow replacing one or more mSATA SSDs with one or more M.2 SSDs, and vice versa. For example, in some embodiments, each storage bank may include a carrier board suitable for coupling to one type of SSD, and the swapping of a storage bank's SSDs may be facilitated by swapping a storage bank's carrier board with a different carrier board suitable for coupling to a different type of SSD. The ability to swap SSDs of different form factors may enhance the computing system's resilience to disruptions in the supply chains of mSATA SSD manufacturers and M.2 SSD manufacturers. Each storage node may have any suitable capacity, including, without limitation, capacities ranging from 128 GB through 2 TB, or higher. Storage nodes having smaller capacities, e.g., 64 MB, 128 MB, 1 GB, 2 GB, 4 GB, 8 GB, 32 GB, etc., may also (or alternatively) be included.

The storage nodes in one or more storage banks may be logically grouped together to form an FPGA-controlled redundant array of independent drives (RAID). As one example, the system 200 may include eight storage banks, with each storage bank including six storage nodes, and the storage banks may be paired to form four RAID devices, such that each RAID device includes twelve storage nodes. In some embodiments, data stored on the storage nodes may be striped, such that data associated with a file or contiguous portions of such file data are stored on different storage nodes. Striping the data in this manner may yield high aggregate bandwidth for accessing/sending such data from/to the storage bank(s) 208. The storage 208 (e.g., the storage nodes) may communicate with resource manager 210 using any suitable interface, including, without limitation, serial ATA (SATA), parallel ATA (PATA), eSATA, SCSI, serial attached SCSI (SAS), IEEE 1394 (FIREWIRE® communication interface), USB, Fibre Channel, INFINIBAND® communication interface, THUNDERBOLT® communication interface, and/or Ethernet (e.g., 10 Gigabit Ethernet, 40 Gigabit Ethernet, 100 Gigabit Ethernet, any other Ethernet standard that is available now or may become available, including, but not limited to, 400 Gigabit Ethernet, etc.). In some embodiments, each storage node includes an SSD, and the storage nodes may be accessed in parallel.

In various embodiments, one or more storage banks may include any number (e.g., 2, 4, 5, 6, 8, 10, 12, or more than 12) storage nodes. In some embodiments, the storage banks collectively include up to 48 storage nodes, though more than 48 storage nodes are also possible. The number of storage nodes in the storage banks may be selected such that the aggregate input/output (I/O) bandwidth of the storage nodes is approximately equal to the aggregate data-processing bandwidth of the computing system's RCMs 202. The number of storage banks and/or the number of nodes in one or more banks may be selected to improve or maximize parallel data exchange between the RCMs 202 and the storage 208 or storage nodes, so that the RCMs 202 can be engaged in data processing up to their processing capacity without letting the I/O become a bottleneck.

The processor(s) 204 can access data from one or more files stored on any of the storage banks 208 via a storage node manager 232. This access by the processor is generally independent of the ability of the RCM(s) 202 to efficiently receive data from a file stored on the storage 208 and/or store data in a file on the storage 208, through a storage node manager 232 without intervention by the processor(s) 204 and/or an OS executing thereon. The processor(s) 204 may communicate with RCM(s) 202 through resource manager 210 and/or through a system bus (not shown). Memory 250 and/or storage 260 may be dedicated to processor(s) 204 and may not be accessible to the resource manager 210 or to the RCM(s) 202.

Resource manager 210 may be configured to manage one or more resources of the reconfigurable computing system, including, without limitation, storage banks 208, RCMs 202, input/output (I/O) resources (not shown), network resources (not shown), and/or routing among the resources of the system. In various embodiments, the resource manager 210 includes a storage node manager 232, which may be configured to access data from files in storage banks 208 without invoking the data access functions of an operating system (OS) executing on processor(s) 204. In some embodiments, the storage node manager 232 may control the routing of data between the RCMs 202 and storage banks 208, between the processor(s) 204 and storage banks 208, and/or between memories 206 and storage banks 208.

In some embodiments, resource manager 210 may include a reconfiguration controller. The reconfiguration controller may be adapted to control reconfiguration of the RCMs 202. For example, the reconfiguration controller may be adapted to control reconfiguration of the reconfigurable computing devices (224, 226), and/or to control reconfiguration of the interconnects within or between the reconfigurable computing devices. In some embodiments, such reconfiguration can result in different protocols and/or different line rates between the reconfigurable computing devices. In some embodiments, processor 204 may request that the RCMs 202 perform a task by sending a suitable request to the reconfiguration controller, and the reconfiguration controller may configure one or more of the RCMs 202 to perform the task. In some embodiments, the reconfiguration controller may configure one or more RCMs 202 to perform multiple tasks. In some embodiments, the reconfiguration controller may initiate reconfiguration of one or more RCMs without the intervention of processor 204. In some embodiments, instead of being separate from the RCMs 202, the reconfiguration controller 210 may be contained within one or more RCMs 202.

In some embodiments, resource manager 210 may include a communications manager. The communications manager may be configured to manage the I/O resources (not shown) and/or network resources (not shown) of the reconfigurable computing system. In some embodiments, the RCMs 202 may be configured to use the system's I/O resources and/or network resources through resource manager 210, without the intervention of the processor 204 or its operating system.

Embodiments of architecture 200 are not limited by the numbers of components shown in FIG. 2. In some embodiments, a reconfigurable computing system arranged in architecture 200 may include any suitable number of RCMs 202 (e.g., one, two, three, four, or more than four RCMs). In some embodiments, different RCMs may include the same number of reconfigurable computing devices or different numbers of reconfigurable computing devices. An RCM may include, for example, one, two, or more than two reconfigurable computing devices. In some embodiments, the system may include any suitable number of storage banks (e.g., eight, fewer than eight, or more than eight), and each storage bank may include any suitable number of storage nodes (e.g., six, fewer than six, or more than six). In some embodiments, the system may include more than one processor 204.

Figure 3:
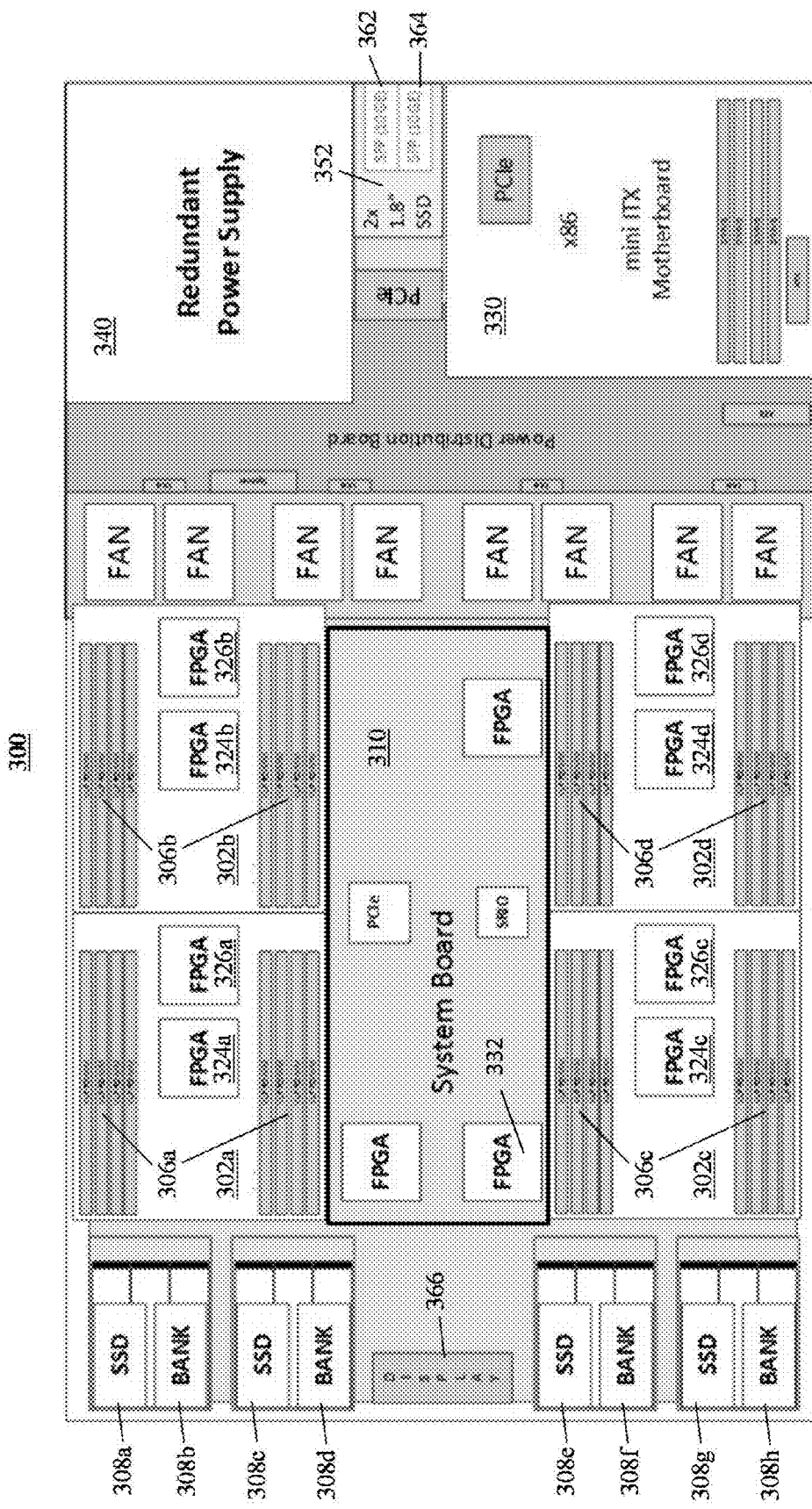
FIG. 3 schematically illustrates a reconfigurable computing system in accordance with some embodiments.

Referring to FIG. 3, in some embodiments a reconfigurable computing system 300 arranged in accordance with architecture 200 may be implemented as a one rack unit (1U) device. The 1U device may be approximately 19 inches wide by 32 inches long by 1.75 inches thick. As can be seen, system 300 includes four reconfigurable computing modules (RCMs) 302 coupled to four corresponding memories 306, eight SSD banks 308, a reconfigurable computing resource manager 310, a motherboard 330, a power supply 340, storage 352, network transceivers 362-364, and display adapter 366, all of which are arranged on a system board.

Each RCM 302 includes two FPGAs 324 and 326, and the memory 306 coupled to each RCM includes up to eight memory modules (e.g., dual in-line memory modules). In some embodiments, the RCMs may include more than eight memory modules. The resource manager 310 includes three FPGAs, a PCIe switch, and a serial RapidIO (SRIO) switch. In some embodiments, one or more of the resource manager's components (e.g., the storage node manager, the reconfiguration controller, and/or the communications manager) may be implemented using one or more of the resource manager's FPGAs. For example, a storage node manager 332 may be implemented using one FPGA, as shown in FIG. 3, or more than one FPGA (not shown). In some embodiments, resource manager 310 may use either the PCIe switch, or the SRIO switch, or both, to control the data flow between the SSD banks 308 and the RCMs 302, and/or between the SSD banks 308 and the memories 306. In some embodiments, resource manager 310 may use the PCIe switch, the SRIO switch, or both, to communicate with motherboard 330, with network transceivers 362, 364, and/or with any other suitable component of system 300. By communicating with network transceivers 362, 364, resource manager 310 may control communications between system 300 and other computing devices (e.g., other reconfigurable computing systems). Any suitable network transceivers 362, 364 may be used, including, without limitation, SFP+, QSFP+, CXP, CFP, CFP2, CFP4, and/or INFINIBAND® communication interface. In some embodiments, network transceiver 362 may be coupled to a user network for communication with user devices. In some embodiments, network transceiver 364 may be coupled to a cluster network for communication with other reconfigurable computing systems.

Display adapter 366 may be coupled to any suitable display device, including, without limitation, an LED display, an LCD display, an e-paper display (e.g., an electrophoretic display), and/or a touchscreen display. In some embodiments, resource manager 310 may be configured to control display adapter 366, such that data from the RCMs 202, memories 306, and/or SSD banks 308 (including, but not limited to, results of data analysis operations or results of system analysis operations) may be displayed by the display device without intervention by motherboard 330 or by any operating system executing thereon. In some embodiments, motherboard 330 may be coupled to display adapter 366, such that the motherboard's processor may control the display adapter.

Motherboard 330 may be any commercially available motherboard. A processor may be coupled to the motherboard, and the processor may execute an operating system (e.g., LINUX® operating system). The processor may have on-chip memory (e.g., cache memory). In some embodiments, additional off-chip memory may be coupled to motherboard 330. The off-chip memory may be dedicated to the motherboard. In some embodiments, motherboard 330 may be coupled (e.g., by PCIe adapter) to storage 352, to network transceivers 362, 364, and/or to storage banks 308.

Power supply 340 may include dual redundant universal AC power supplies of any suitable type (e.g., 100 VAC-240 VAC, 50 Hz-60 Hz). In some embodiments, the system 300 may include one or more fans, e.g., eight hot-swappable fans.

Hardware-Based Storage Management

Motivation for Hardware-Based Storage Management

Many computers use file management software to access data stored in files stored on storage devices (e.g., hard disc drives (HDDs), solid state drives (SSDs), etc.). The file management software manages requests by applications to open and close files, create and delete files, read data from files, write data to files, etc. To perform these and other file management operations, the file management software may maintain file system records indicating one or more locations in a storage device where a file or parts thereof are stored. When an application requests access to a file or a particular portion thereof, the file management software uses these file system records to determine the address of the requested data on the storage device, transmits the appropriate signals to the storage device to obtain the requested data, and passes the requested data to the application. In various computer systems, the file management operations are typically performed by an operating system running on a general-purpose, programmable processing device (e.g., a central processing unit ("CPU")).

Computer systems generally access data from one or more files during the execution of software applications such as applications for audio/video processing, financial transactions, data mining, etc. The CPU that performs the file management operations may additionally execute one or more software applications, or a computer system may include additional processors for executing the software applications. Some computer systems employ specialized processors such as application specific integrated circuits (ASICs), reconfigurable processing units (e.g., field programmable gate array (FPGA) processing units), etc., for executing the software applications or certain portions thereof. Such specialized processors can be faster and/or more efficient than general purpose processors and, as such, are often used to execute computationally intensive tasks and/or tasks that manipulate large amounts of data (e.g., tens or hundreds of megabytes, gigabytes, terabytes, or even larger sizes of data).

The ASICs and/or reconfigurable (e.g., FPGA-based) processing units generally rely on conventional file management software for accessing data in files stored on storage devices. Therefore, computer systems that include specialized processors typically include a general purpose CPU which executes an operating system with conventional file management software. Generally in such systems, the CPU uses the conventional file management software to obtain data from a storage device on behalf of a specialized processor and may store the data in a memory that is directly accessible to the specialized processor or may supply the data directly thereto. Likewise, after the specialized processor computes a result, the result may be stored in the memory directly accessible to the specialized processor for retrieval by the CPU or may be sent directly to the CPU. The CPU then uses the conventional file management software to store the result in a file stored on the storage device.

Generally in such computing systems, an operating system (OS) maintains file system data that indicates, for each of one or more files, where the files (or portions thereof) are stored and/or are to be stored on one or more storage devices (e.g., a hard disk, SSD, etc.). A file may be stored in a contiguous or non-contiguous set of storage units, often called blocks, in a single storage device or across several storage devices. The file system data typically includes for each file an identifier of the storage device where the file or a portion thereof is stored/to be stored, logical block(s) of file, and physical location(s) (i.e., address(es)) of corresponding physical unit(s)/block(s) of the storage device(s).

One example of a file system well suited for storing and accessing large files (e.g., files of sizes on the order of tens or hundreds of megabytes, gigabytes, terabytes, or more) is an extent-based file system. Extent-based file systems are well known and have widespread use in contemporary computing systems. In an extent-based file system, an extent includes one or more contiguous units/blocks of storage. The extent-based file system allocates one or more extents to a file, which tends to reduce file fragmentation and/or can speed up file access, because an entire large file or at least a significant portion thereof can be stored in a single extent. The allocation of extents often limits the amount of data in the file system directory, as well.

When a processor (e.g., a CPU) needs to access one or more data elements from a file and/or is ready to store such data element(s) in a file, the OS generally determines the logical file block(s) corresponding to such data element(s), computes the physical address(es) corresponding to those logical block(s) using the file system, and accesses and/or stores the data element(s) using the physical address(es). In a computing system that includes one or more specialized processor(s), such specialized processor(s) are typically not configured to generate and/or use file system information and/or to access data using such information. Instead, the specialized processors typically rely on a CPU/OS to perform file access operations, i.e., reading, updating, and/or writing one or more data element(s) from/to a specified file. This may create a performance bottleneck because data processing by the specialized processor(s) becomes dependent on the CPU/OS.

One solution is to configure one or more specialized processors to generate and/or use the file system information and/or to provide file access functionality. This, however, can increase the size, complexity, and/or cost of the specialized processor(s) and may also decrease their performance. Moreover, if only one or a few specialized processors(s) are configured to provide the file access functionality, the performance bottleneck may still exist because other specialized processor(s) that are not configured to provide the file access functionality may need to depend on the specialized processor(s) that are so configured and or on the CPU/OS. If many or all specialized processor(s) are configured to provide the file access functionality, in addition to likely increase in size, complexity, cost, and/or processing time, the specialized processor(s) may also become burdened with coordinating file access functionality among each other.

In many computer systems, the use of conventional, CPU-based file management software to manage a specialized processor's access to storage devices creates a communication bottleneck, which can significantly hamper the overall system performance. For example, when conventional, CPU-based file management software is used to manage the flow of data between reconfigurable device(s) and storage, in each processing step, the reconfigurable device(s) may be capable of receiving and/or outputting data of size greater than the CPU is capable of providing to and/or receiving from the reconfigurable device(s). For example, a reconfigurable device may receive 128 or 256 bits of data per clock cycle while the CPU may provide only 32 or 64 bits of data per clock cycle. Thus, the system's performance may be constrained by the bandwidth of communication between the reconfigurable devices and the storage.

In addition, the CPU-based file management typically introduces delays in various data transfers. For example, when the reconfigurable device requests data from the CPU, the CPU and the file management software compute the location(s) of the requested data on the storage device. Then, using the computed location(s), the CPU requests the data from the storage device. After the storage device sends the data to the CPU or to a memory, the CPU sends the data to the reconfigurable device or the device can access the data from the memory. The delays associated with these communications are often a significant component of the above-described communication bottleneck.

In applications in which specialized processors, such as reconfigurable devices, ASICs, etc., are used to process large amounts of data, the specialized processors may read large amounts of data from the storage device, may produce and consume large amounts of intermediate data while performing one or more data processing tasks, and/or may store large amounts of intermediate data and/or results in the storage device. This can result in thousands, millions, billions, or even more data access operations between the specialized processor and the data storage. As such, even a relatively short delay on the order of several nanoseconds or milliseconds due to the communication bottlenecks described above can result in a significant delay in the execution of the computationally intensive and/or data intensive tasks. Such delays can therefore make the use of the specialized processors difficult or even impractical, regardless of other benefits offered by such processors.

A need for improvement in the bandwidth and/or latency of communication between specialized processors such as reconfigurable FPGA units and storage devices was recognized. An improved data access system can increase the performance of the computing systems using the specialized processors, particularly for highly-parallel data processing applications and/or applications processing large amounts of data. In various embodiments, improved data access is facilitated, in part, via a specialized storage node manager that allows a specialized processor to read/write data from/to a storage device with little reliance on the CPU and the file management software, thereby enhancing the specialized processor's computational throughput and communication bandwidth. The specialized processor may rely on the CPU to facilitate file access by providing file allocation data indicative of a location in storage of a file from which the storage node manager may read data and/or to which the storage node manager may write data. For example, in a system where the operating system uses an extent-based file system, the operating system may provide a portion of extent data to the storage node manager. The provided portion of extent data may identify the location in storage of a file (or a portion thereof) that is accessible to the storage node manager for reading and/or writing. After the operating system has provided the data identifying the location of the file, the storage node manager may access the file (e.g., read data from the file and/or write data to the file) one or more times without any further intervention from the operating system.

This section describes hardware-based file management techniques for managing access to storage devices. In some embodiments, these hardware-based file management techniques increase the bandwidth and/or decrease the latency of communication between a specialized processor (e.g., a reconfigurable device) and the storage devices, relative to using CPU-based file management software as an intermediary. A hardware-based storage node manager may be implemented using one or more reconfigurable devices, which can further improve communications between the specialized processor and the storage devices by enabling the storage node manager to adapt to the storage access patterns of the specialized processor. For example, the specialized-hardware-based manager may adapt the sizes of its internal buffers or the sizes of the pages it fetches from the storage devices based on, e.g., the width of the bus coupling the storage from which the data is accessed to the specialized processor, the size of the data elements being accessed by the specialized processor, the rate at which the specialized processor is accessing data elements, the type of processing task (e.g., tasks involving processing of fast streaming data, tasks involving batch processing of a large dataset), etc.

Hardware-Based Storage Management

Referring back to FIGS. 1-3, the resource managers 110, 210, 310 include a hardware-based storage node manager (e.g., the storage node manager 132 shown in FIG. 1, 232 shown in FIG. 2, and 332 shown in FIG. 3). In some embodiments, the hardware-based storage node manager is an FPGA-based storage node manager, i.e., at least a portion of the storage node manager is implemented using one or more FPGAs. For simplicity, the description of hardware-based storage management herein refers primarily to a computer system having an architecture 200 shown in FIG. 2. It should be understood, however, that the techniques described herein are also applicable to the corresponding components of FIGS. 1 and 3. Also for simplicity, the storage management is described in terms of accessing a file or data associated therewith. Accessing, as used herein, includes not only reading data associated with a file or portions of such data from the storage or one or more storage nodes included in the storage, but also updating such data or portions thereof on the storage/nodes, and/or writing/storing data or portions thereof to the storage/storage nodes.

It is described above that file data access in conventional computing systems using specialized processors is facilitated using a CPU/OS and, to this end, the OS generally provides file management functionality, and generates and maintains file management data. It is also described that using a CPU/OS to access file data generally creates a performance bottleneck. The use of CPU/OS for accessing file data in computing systems such as those described with reference to FIGS. 1-3 presents an additional challenge.

In particular, these systems generally include several storage nodes to provide fast, parallel data access to one or more specialized processors, e.g., RCMs, using, e.g., one or more buses, interfaces, etc. It is described that the number of storage modules/banks and the number of storage nodes included in one or more storage modules/banks may be configured according to the processing and/or aggregate I/O capacity of the specialized processors/RCMs (e.g., to maximize utilization thereof). While the OS can be configured to manage and access file data from several storage nodes (such as the storage nodes in an RAID system, for example), if the storage subsystem is customized as described above, the OS may also need to be customized and/or adapted to provide file management for that customized storage subsystem and to access data therefrom. This may be cumbersome or even infeasible.

Moreover, the CPU generally cannot access data in parallel from a large number of storage nodes and, in general, must access such data sequentially. Therefore, if a CPU/OS is used for file data access, different specialized processors (e.g., RCMs) generally cannot access data from the several storage nodes in parallel, via buses/interfaces of selectable widths. As the specialized processors may need to wait for the CPU/OS to access file data sequentially, the collective processing power of the specialized processors/RCMs may be underutilized. Various disadvantages of implementing a file system on one or more specialized processors are also described above.

In order to maximize the utilization of the RCMs 208, the storage node manager 232 facilitates file data access between storage 208 and the RCMs 202 and/or memory 206 without relying on the CPU 204 and the OS executing thereon during data read/update/write operations, while employing the OS for file management, so that neither the storage node manager 232 nor any RCM 202 needs to implement a file management system. In addition, the storage node manager 232 accesses only a certain portion of the overall file management data from the OS and manipulates the file management data so that the OS need not be customized substantially according to the structure of the storage 208 in terms of the number of banks and/or nodes.

In general, the storage 208 may include "$N_B$" banks and each bank may include "$N_{sn}$" storage nodes. The $N_{sn}$ storage nodes may be partitioned into $N_G$ groups, where $N_G \geq 1$. In some embodiments, each group includes the same number of storage nodes, denoted $N_{sn}^G$, where $N_{sn} = N_G \times N_{sn}^G$. Data may be accessed (access including reading, updating, and/or writing data, as described above), from each storage node in multiples of a storage unit, e.g., storage node sector. The size in bytes of a storage node sector may be denoted as $S_{ns}$. The file data may be striped across the storage nodes of a single group of a single bank, or across the storage nodes of two or more (or all) groups of a single bank. Additionally or alternatively, the file data may be striped across the storage nodes of some or all of the groups of two or more banks, e.g., across the storages nodes of both groups of one bank and across the storage nodes of only one of the two groups of another bank. Only for the sake of simplicity, the description herein considers that the file data is striped across all $N_{sn}$ storage nodes of a single bank. Thus, file data may be accessed from the storage 208 in multiples of another storage unit called storage module sector. The size in bytes of the storage module sector, denoted $S_{ms}$, is given by $S_{ms} = N_{sn} \times S_{ns}$. In general, $N_{sn}$ may represent a specified or selected number of storage nodes across which the file data is to be striped.

As an illustrative, but non-limiting example, in one embodiment, the number of storage banks is $N_B = 4$, and the number of groups per bank $N_G = 2$. The number of storage nodes per group $N_{sn}^G = 6$ and, as such, the number of storage nodes per bank $N_{sn} = 12$, for a total of 48 storage nodes. The storage node sector size $S_{ns} = 512$ bytes and, as such, the storage module sector size $S_{ms} = 6144$ bytes, i.e., 6 Kbytes. In other embodiments, the number of storage banks $N_B$ can be any number (e.g., 1, 2, 3, 5, 6, 8, 10, 12, 16, 20, 32, or more), and the number of groups per bank $N_G$ can also be any number (e.g., 1, 2, 3, 5, 6, 8, or more). Similarly, the number of storage nodes per group $N_{sn}^G$ can be any number (e.g., 1, 2, 3, 5, 6, 8, 10, 12, 16, 20, 32, 40, 48, 64, or more) and, as such, each of the number of storage nodes per bank $N_{sn}$ and the total number of storage nodes can be any number (e.g., 1, 2, 3, 5, 6, 8, 10, 12, 16, 20, 32, 40, 48, 64, or more). In some embodiments, one or more (or all) of these numbers are powers of two while in other embodiments one or more (or none) of these numbers is a power of two. In various embodiments, the storage node sector size $S_{ns}$ can be fewer or more than 512 bytes (e.g., 64, 128, 1 K, 2K, 4K bytes, etc.) and, correspondingly, the storage module sector size $S_{ms}$ in bytes can be any number (e.g., 2 K, 4K, 8 K, 10 K, 16 K, 32 K or more).

In various embodiments, the OS provides the file management functionality according to the storage module sector size $S_{ms}$ and independently of the particular structure of the storage module in terms of the number of storage banks ($N_B$), the number of groups per bank ($N_G$), the number of storage nodes per group ($N_{sn}^G$), the number of storage nodes per bank ($N_{sn}$), the total number of storage nodes, and/or the storage node sector size ($S_{ns}$). Thus, the resource manager 210 and/or the storage node manager 232 can configure the storage 208 to include any suitable values of $N_B$, $N_G$, $N_{sn}^G$, $N_{sn}$, the total number of storage nodes, and/or the storage node sector size ($S_{ns}$), such that the parallelization of data access between the storage 208 and the RCM(s) 202 and/or memory modules (206), and utilization of the RCM(s) 202 is maximized, without needing substantial reconfiguration or customization of the OS. Regardless of any selected storage configuration, the OS views the storage 208 as having a particular storage module sector size $S_{ms}$ (e.g., 6 Kbytes in the example described above), and generates and maintains the file management data and provides the file management functionality according to $S_{ms}$.

In typical operation of a system having an architecture depicted in FIG. 2, several files may be stored on and accessed from the storage 208. The sizes of different files can change, i.e., grow or shrink, during the course of operation, and the order in which the files are accessed during operation can be different than the order in which the files are created, and some files may be deleted. As such, the data of a single file is often not stored in a single contiguous portion on the storage 208. Instead, the file data is typically fragmented into several portions and these portions are interleaved with data from one or more other files. Some extent based and other file systems can reduce fragmentation but data fragmentation generally exists, especially when file sizes are large, such as tens or hundreds of megabytes or gigabytes, or even more. In order to manage and access file data efficiently, an OS may generate and maintain a complex data structure for file management data. Such a data structure may include pointers, trees, hash tables, etc.

The OS may allocate one or more extents to each file, where each extent is a contiguous portion of the storage, and the size of the contiguous portion can be a multiple of the storage module sector size $S_{ms}$, or a block size that is related to $S_{ms}$. The different extents, however, are generally non-contiguous portions of the storage and may have different sizes. Therefore, the OS generally maintains for each extent allocated to a file a starting address of the extent and a length of the extent specified in a suitable unit such as the number of bytes, number of blocks, number of sectors, etc.

To illustrate, $S_{ms}$ may be 6 Kbytes (as described in one example above) and two extents may be allocated to a file File_A. In this example, the starting address of the first extent is 6 K (storage node sector 12 in the example of FIG. 4), and the size thereof is 6 Kbytes i.e., a single sector of the storage module. The starting address of the second extent is 30 K (storage module sector 60 in the example of FIG. 4) and the size thereof is 15 Kbytes. As such, the second extent occupies three consecutive sectors of the storage module. The first two of these are occupied completely, and the third sector is occupied only partially. The starting addresses and extent sizes are illustrative only. The number of extents can be any number such as 1, 2, 3, 5, 6, 7, 10, 11, etc., and the number of extents associated with different files can be different. For each extent, the OS may also maintain additional information such as a file identifier, logical starting block of the file, etc.

In order to access data from a particular file, the storage node manager 232 does not generate or access from the OS the entire data structure that stores the overall file management data that is generated and maintained by the OS. Instead, with reference to FIG. 4, the storage node manager 232 obtains, from the OS, selected extent-related information for the file to be accessed, manipulates the received information as described below, and stores the modified information in an extents table 450, for subsequent use during file access. The size of the information corresponding to each extent that is maintained by the OS can be expressed as a parameter ExtentInfoSize. The ExtentInfoSize can be specified in terms of a number of bytes (e.g., 16, 32, 40, 64, 80, 128 bytes, etc.), or in terms of any other suitable unit. In order to store information about all of the extents of a file to be accessed, in some embodiments, the size of the extents table (e.g., the table 450) that is maintained by the storage node manager 232 can be expressed as the number of extents of a file times ExtentInfoSize. The extents table size can be specified in number of bytes or in any other suitable unit.

In some embodiments, the storage node manager 232 stores an address of extents information data (e.g., an address of the extents table 450) corresponding to a file to be accessed (e.g., File_A) in the register R_ExtentInfoAddress 402. The storage node manager 232 may also receive from the OS the number of extents allocated to the file to be accessed and ExtentInfoSize for each extent, and store in a register R_ExtentTableSize 404 the size of the extents table (e.g., the table 450) as the number of extents of a file times ExtentInfoSize. As such, each row of the table 450 represents a particular extent of the file to be accessed, and all rows have the same size specified by the parameter ExtentInfoSize. As one example, for the file File_A the storage node manager 232 would store the address of the extents table 450 in the register R_ExtentInfoAddress 402. If ExtentInfoSize for the extents of the file File_A is 64 bytes, the storage node manager would store 128 bytes (i.e., 2*64 bytes) in the register R_ExtentTableSize 404, indicating that the table for File_A (e.g., the table 450) would have two rows 452a, 452b, corresponding to the two extents of the file File_A. Each row of the extents table 450 may include a Length field 454 to indicate the size of that extent (e.g., in bytes) that is actually used by the file data, and an Address field 456 identifying the starting address of the extent. Each row 452 may also include one or more additional fields, e.g., a file identifier 458, etc.

In some embodiments, the storage node manager 232 also obtains from the CPU 204, the OS executing thereon, and/or from one of the RCMs 202, the destination for the file data to be accessed from the storage 208. The destination can be an RCM 202, the memory 206 associated therewith, the CPU/OS 204, the memory 250, and/or the storage 260. The destination information may be stored in a register R_Destination 406. Once the information described above is received in various registers 402-406, the CPU/OS 204 and/or the resource manager 210 may set a flag or a register R_GO 408, allowing the storage node manager 232 to perform data access.

As described above, the OS generally provides the file management functionality including the extents based allocation according to the storage module sector size $S_{ms}$, and independently of the particular structure of the storage module in terms of the number of storage banks ($N_B$), the number of groups per bank ($N_G$), the number of storage nodes per group ($N_{sn}^G$), the number of storage nodes per bank ($N_{sn}$), the total number of storage nodes, and/or the storage node sector size ($S_{ns}$). As such, the OS provides the starting address of each extent according to the storage module sector size $S_{ms}$. To illustrate, in one example the starting addresses for the two extents of the file File_A as provided by the OS are 6 K and 30 K, respectively, as described above. In general, the OS may provide the starting address of the extent as an address in bytes, as an address in sectors of the storage module, etc. Depending on the particular architecture of the storage module in terms of the number of storage nodes, a sector of a storage module as a whole may not correspond to the sectors of individual storage nodes.

The storage node manager 232, however, has all the information about the specific configuration of the storage 208 in terms of $N_B$, $N_G$, $N_{sn}^G$, $N_{sn}$, the total number of storage nodes, and/or the storage node sector size ($S_{ns}$). As such, in order to access the file data from a selected set of $N_{ns}$ storage nodes across which the file data are to be striped, the storage node manager 232 coverts the stating address of each extent, whether specified in terms of bytes or sectors of the storage module as a whole, into a starting address in terms of the sectors of the storage nodes. To illustrate, in the foregoing example where $N_{sn}$=12 and the storage node sector size $S_{ns}$=512 bytes, the starting address 6 K of the first extent is divided by $S_{ns}$ to obtain the corresponding starting storage nodes sector address as 12.

The storage node manager 232 then divides the starting storage nodes sector address by $N_{sn}$ to obtain a starting sector address in each storage node, and uses this converted sector address for data access to each of the $N_{sn}$ storage nodes. To illustrate, in the forgoing example, the file data is striped across $N_{sn}$ storage nodes (e.g., 12 storage nodes 480a-480l). The starting sector address of each storage node is therefore 12/12=1, i.e., the file data represented by the first extent can be accessed by accessing data from sector address "1" of each of the $N_{sn}$ (e.g., 12) storage nodes 480a-480l. In various embodiments, the starting address(es) of extent(s) may be stored by the storage node manager 232 in the Address field(s) 456 of the extents table 450 in bytes, storage module sectors, or storage node sectors.

In the foregoing example, the starting addresses of the two extents, as provided by the OS, are expressed in bytes. In some embodiments, the OS may express the starting address of an extent in storage module sectors. In the example above, the starting addresses of the first and second extents, when expressed as storage module sectors, are 1 and 5, respectively. Likewise, other components that access the storage module via the storage module manager (e.g., the RCMs) may specify the address of an extent in bytes or in storage module sectors. In some embodiments, a component that provides the address of an extent to the storage module manager may also provide a parameter indicating whether the extent address is specified in bytes or in storage module sectors. In some embodiments, the OS may express the extent address in storage module sectors, and the RCMs may express the extent address in bytes. In cases where the OS, an RCM, or some other component is configured to specify an extent address in storage module sectors, the reconfigurable computing system may provide that component with data indicating the size of a storage module sector, without necessarily providing that component with data indicating the other parameters of the storage module.

The length in bytes of the file data to be accessed from the first extent is specified by the Length field 454 of the corresponding row 452 in the extents table 450. The storage node manager 232 can divide this length by the storage node sector size ($S_{ns}$) and further by $N_{ns}$ (i.e., the number of storage nodes across which the file data are to be striped), to identify the number of sectors to be accessed from each storage node. In the foregoing example, the Length field 454 of the first extent is 6 Kbytes and (6 Kbytes/(512 bytes*12)=1). Therefore, the storage node manager 232 would access one sector of each storage node 480a-480l, starting from the sector address "1." The data from the sectors 482a-482l of the storage nodes 480a-480l can be accessed in parallel.

In the foregoing example, the starting address of the second extent of the file File_A, as provided by the OS is 30 K. Therefore, using the values of the parameters $S_{ns}$ and $N_{ns}$, the storage node manager 232 can determine that data from the sector 60 is to be accessed and may store the sector address 60 in the Address field 456b. This sector address corresponds to sectors at address "5" of each of the $N_{sn}$ (e.g., 12) storage nodes 480a-480l since 60 divided by 12 is 5. Furthermore, if the length in bytes as specified by the Length field 454b is 15 K, the storage manager 232 would also determine that to access 15 Kbytes of file data, data from three sectors of each storage node, namely 484a-484l, 486a-486l, and 488a-488l must be accessed. As this would result in a total of 18 Kbytes of data, the storage manger 232 may discard data accessed from the sectors 488g-488l, after it has been accessed. As such, the data access from the striped storage nodes can be uniform and not dependent on the actual number of bytes to be accessed. The storage node manager 232, however, can truncate the accessed data as necessary, using values of the various parameters described above, and provide only the relevant data to the specified destination.

Thus, in various embodiments, the OS can maintain the overall file system and generate extents based information for each file generally independently of the structure of the data storage. The storage node manager accesses only specific extents information from the OS, manipulates that information according to the structure of the data storage, and then facilitates access to the data of one or more files without needing further involvement of the CPU/OS. Thus, the bottleneck described above can be avoided or significantly reduced, without burdening the RCMs. The structure of the storage can be optimized to increase parallel access to the data and/or to increase the performance of the RCMs, without needing substantial corresponding customization of the OS.

In various embodiments, data of a file is read from the storage and may be provided to one or more RCMs and/or to memory units associated therewith. Alternatively or in addition, the read data may be provided to the CPU(s)/OS. In some embodiments, one or more RCMs and/or CPU(s) may update the data of the file by replacing old data values with new ones. In some embodiments, the RCM(s) and/or the CPU(s) may generate new data and/or may delete existing file data, causing the file size to change. In such cases, the OS may update the extents information as necessary, and the storage node manager may use the updated extents information, e.g., to store new data in the file. In some embodiments, an RCM may be configured to store data in a new file. As such, the OS may generate extents information for the new file and the storage node manager may use that extents information, allowing the RCM to store the data in the new file. The data in the newly generated file may be used by one or more other RCMs and/or by the CPU(s)/OS. Some embodiments include more than one storage node manager. For example, a dedicated storage node manager may be associated with each storage bank.

In various embodiments, the operating system running on processor(s) 204 employs an extent-based file system such as e.g., ext2, ext3, ext4, XFS, NTFS, HFS, HFS+, or any other extent-based file system for data stored in the storage 208. Extents information may be accessed by the storage node manager 232 from other extents based files systems, including those that may be developed in the future via a suitable interface. In some embodiments, the extent information is obtained from the OS by the storage node manager 232 using various standard techniques. In one embodiment, a fiemap( ) system call is used, which both the operating system and extent-based file system support. The fiemap( ) system call is an I/O control (ioctl) method allowing a program running in user space to retrieve file extent mappings.

The storage node manager 232 as described herein is generally light weight, i.e., the storage node manager 232 may not perform a number of functions of a typical file manager, or of the overall memory management subsystem of an operating system. Instead, the storage node manager 232 uses extent lists represented as starting sectors and contiguous sizes to read and write data without operating system interference, which allows for rapid analysis of the data and rapid writes of results of that analysis back to the storage 208. In this way, in various embodiments, the storage node manager 232 can facilitate fast and efficient exchange of data between one or more specialized processors (e.g., RCMs 202) and one or more storage devices/nodes included in the storage 208.

Returning to FIG. 3, the hardware-based storage node manager 332 includes provisions for reading data from and writing data to one or more storage devices/nodes. Storage node manager 332 may use any interface suitable for communicating with the computing system's storage node(s), including, without limitation, serial ATA (SATA), parallel ATA (PATA), eSATA, SCSI, serial attached SCSI (SAS), IEEE 1394 (FIREWIRE® communication interface), USB, Fibre Channel, INFINIBAND® communication interface, THUNDERBOLT® communication interface, and/or Ethernet (e.g., 10 Gigabit Ethernet, 40 Gigabit Ethernet, 100 Gigabit Ethernet, etc.). When the address of a storage access request has been determined, the storage node manager communicates the appropriate request (e.g., a read request or a write request) and the corresponding data (e.g., the address for a read request, or the address and the data to be stored for a write request) to the storage node(s).

In one embodiment, large-scale data striping (similar to RAID 0 architecture) for both read and write access is possible independent of operating system and processor(s) (e.g., the processor(s) 204 shown in FIG. 2), whereby the OS specified starting addresses in the extent lists and their respective contiguous sizes are provided to, and modified and managed by the hardware storage node manager 332, as described above with reference to FIG. 2. As such, the same starting sector can be used across a large number of storage devices/nodes in each storage module/bank (e.g., 308a-h), and the requested size can be split amongst the devices/node in each storage module/bank. Specifically, in various embodiments, the storage node manager performs modulo arithmetic given the size of the storage bank and the extent list size(s) as provided by the processor(s)/OS, to access locations across the storage bank for reading or writing the specified data elements.

This implementation differs from typical proprietary RAID 0 architectures at least because these embodiments utilize derivative file extent information generated by the storage node manager using the extent-based file system managed by the OS. The derived information can be utilized across any selected number of storage nodes, independent of any operating system and CPU, as described above with reference to FIG. 2. This allows the processor(s) and their operating system(s) to interact with the storage node manager precisely the same way, independent of how many storage devices/nodes are included the storage module(s)/bank(s), or the total number of storage devices/nodes.

In some embodiments, the computing system may adapt the hardware-based storage node manager 332 based on any suitable information, including, without limitation, the characteristics of the processing devices served by the storage node manager and/or the characteristics of those processing devices' storage access requests. In some embodiments, characteristics of a processing device on which adaptations are based may include, without limitation, the width of the bus coupling the storage node manager to a processing device. In some embodiments, characteristics of a processing device's storage access requests on which adaptations are based may include, without limitation, the size of the data elements being accessed by the processing device and/or the rate at which the processing device is accessing data elements. Adaptation of the storage node manager may, in some embodiments, improve the performance of the computing system.

Figure 5:
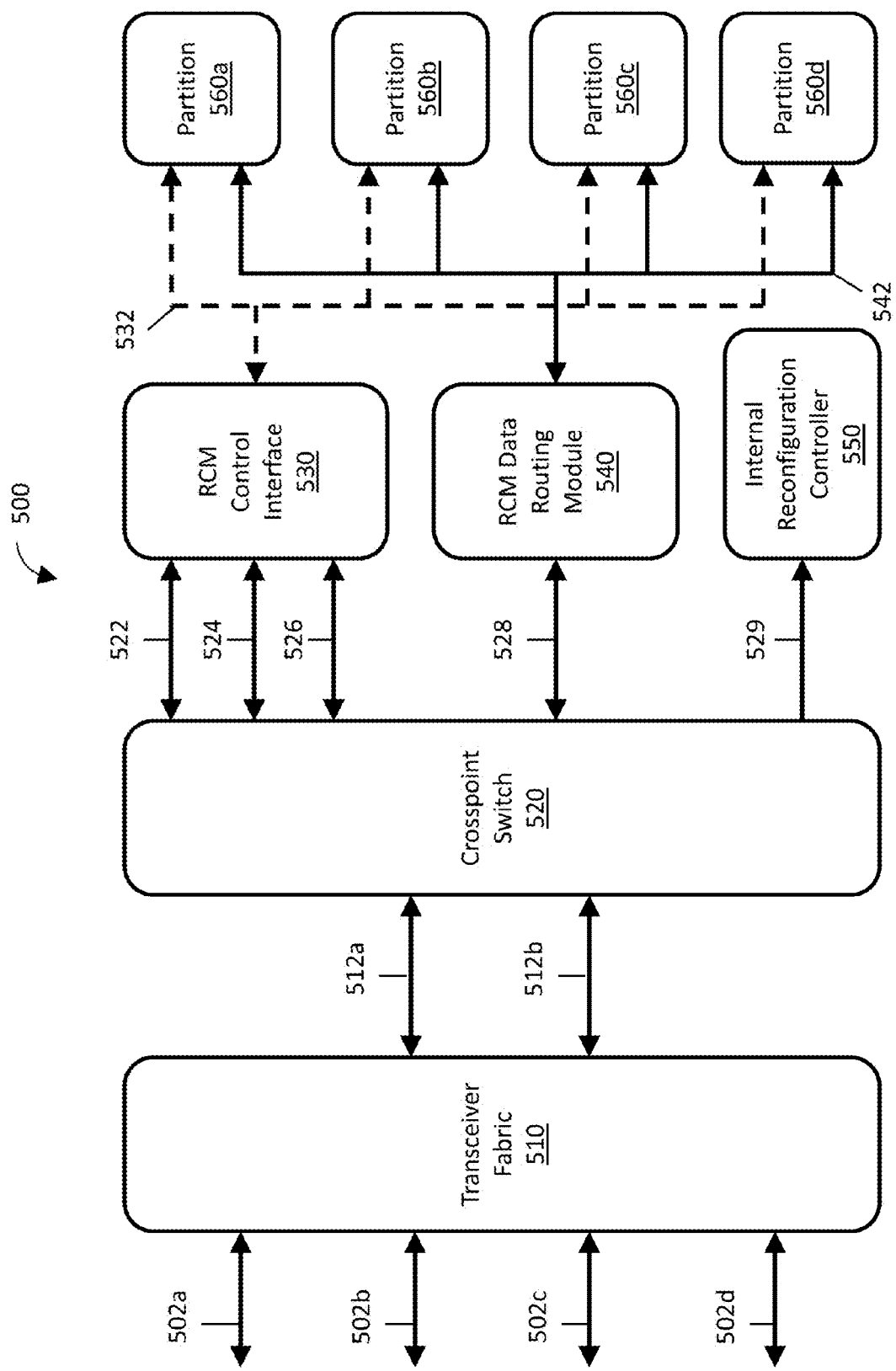
FIG. 5 is a block diagram of a bus fabric of a reconfigurable computing module in accordance with some embodiments.

Referring to FIG. 5, in some embodiments an RCM includes an RCM fabric 500, which communicatively couples the RCM's processing resources to the rest of the RCM, and thereby, to the system's resource manager and/or storage. The RCM fabric 500 may include an RCM transceiver fabric 510, an RCM crosspoint switch 520, an RCM control interface 530, an RCM data routing module 540, an internal reconfiguration controller 550, a data interconnect 542, and a control interconnect 532. The data interconnect 542 may be coupled to one or more reconfigurable processing partitions 560 (e.g., four partitions 560a-560d).

In some embodiments, RCM fabric 500 is implemented using one of the two RCM's reconfigurable computing devices (one of 224, 226 shown in FIG. 2). In other embodiments, the components of RCM fabric 500 may be divided between the reconfigurable computing devices in any suitable way. For example, reconfigurable computing device 224 may implement the reconfigurable processing partitions 560, and reconfigurable computing device 226 may implement the remainder of the RCM fabric 500 (e.g., the transceiver fabric 510, crosspoint switch 520, control interface 530, data routing module 540, internal reconfiguration controller 550, data interconnect 542, and control interconnect 532).

RCM transceiver fabric 510 communicatively couples the two RCM FPGAs together via a number of I/O lanes 502. The I/O lanes may be implemented using any suitable I/O technology, including, without limitation, high-speed (e.g., 10 Gb/s) serial I/O. The I/O lanes may carry any suitable information, including, without limitation, operand data (e.g., operands for operations to be performed by the RCM), result data (e.g., results of operations performed by the RCM), and/or control data (e.g., instructions for reconfiguring the RCM and/or data relating to reconfiguration of the RCM). In some embodiments, transceiver fabric 510 may switch signals between the relatively high-frequency, low bit-width I/O lanes 502 and one or more relatively low-frequency, high bit-width buses 512 (e.g., an operand/result data bus 512a and a control data bus 512b). In some embodiments, the aggregate bit-width of the buses 512 may be hundreds or thousands of bits. In some embodiments, the frequencies of the buses 512 may be adjustable between tens of MHz and hundreds of MHz.

The RCM buses 512 may be coupled between RCM transceiver fabric 510 and RCM crosspoint switch 520. In some embodiments, RCM crosspoint switch 520 may route incoming data from RCM transceiver fabric 510 to RCM control interface 530 (e.g., via local bus 522, interrupt bus 524, and/or message bus 526), to RCM data routing module 540 (e.g., via operand/result data bus 528), and/or to internal reconfiguration controller 550 (e.g., via control data bus 529), as appropriate. In some embodiments, RCM crosspoint switch 520 may route incoming data from RCM control interface 530 and/or RCM data routing module 540 to RCM transceiver fabric 510. In some embodiments, the maximum bandwidth between RCM crosspoint switch 520 and the downstream components 530-550 may be greater than the maximum rate of data throughput between system storage and transceiver fabric 510. In this way, bus fabric 500 may be configured to accommodate future increases in the rate of data throughput between system storage and RCM transceiver fabric 510 via I/O lanes 502 without requiring modifications to the RCM architecture.

RCM data routing module 540 may be configured to route incoming operand data from the RCM crosspoint 520 to one or more of the RCM's reconfigurable partitions 560, and/or to route incoming result data from reconfigurable partitions 560 to RCM crosspoint 520, for further transmission of the data (e.g., to a storage device, another RCM, or another processing device) via I/O lanes 502. In some embodiments, the data interconnect 542 coupling the RCM routing module 540 to the reconfigurable partitions 560 may be hundreds or thousands of bits wide.

In some embodiments, the RCM bus fabric 500 includes an RCM data routing module 540 for routing data between the RCM's partitions 560 (e.g., between one partition and another partition, or between a partition and another component of the reconfigurable computing system). In such embodiments, the RCM bus fabric 500 also includes a data interconnect 542 coupling the RCM's partitions 560 to the RCM's data routing module 540.

Data interconnect 542 may be configurable to operate in various modes, including, without limitation, a parallel interconnect mode, a sequential interconnect mode, and/or a conditional interconnect mode. In the parallel interconnect mode, data interconnect 542 may route the same data to two or more partitions 560 in parallel, thereby allowing those partitions 560 to operate on the data in parallel. In the sequential interconnect mode, data interconnect 542 may route input data provided by the crosspoint switch to a first partition, route result data produced by the first partition to a second partition, and so on until the result data produced by the last partition is routed back to the crosspoint switch 520, thereby allowing the partitions 560 to operate on a data stream in sequence (e.g., in pipelined fashion). In the conditional interconnect mode, data interconnect 542 may determine the partition to which data is routed based on data (e.g., data received from the crosspoint switch or data provided by the partitions), thereby allowing data interconnect 542 to implement control flow logic (e.g., if-then-else) in hardware.

In some embodiments, each RCM includes its own RCM bus fabric 500, and each of the RCM bus fabrics is connected to the reconfigurable computing system's resource manager (110, 210, 310, shown in FIGS. 1, 2, and 3, respectively). Thus, the reconfigurable computing system may include a multi-RCM bus fabric coupling reconfigurable partitions 560 on different RCMs to each other and to the system's storage (108, 208, 308). The RCM control interface 530 may determine the mode of the data interconnect by providing control signals on control interconnect 532 in response to control data received from the crosspoint switch. The reconfiguration controller 550 may be configured to independently reconfigure the partitions. In another embodiment, one of the two RCM FPGA devices (for example, in reference to RCM 202a, either 224a or 226a) may contain bus fabric 500, and the other RCM FPGA may act solely as a data switching and routing engine to the reconfigurable system's resource manager and the local RAM resources of the RCM (302a, 306a, and so on). In that case, the two RCM FPGAs become functionally distinguishable, where one is dedicated to primitive processing, and the other for managing off-RCM data switching and routing. This can allow for improved processing performance on the primitive FPGA.

In some embodiments, an FPGA unit is a single partition 560 of a single FPGA fabric 500 implemented by a single FPGA device/chip 224 or 226 shown in FIG. 2. In some embodiments, an FPGA unit can be a combination of two or more partitions 560 of a single FPGA fabric 500. In some embodiments, an FPGA unit includes all of the partitions 560 of a single FPGA fabric, i.e., each device 224 (or 226) is an FPGA unit. Regardless of how an FPGA unit is configured in a particular implementation, in general, any FPGA unit can be configured to receive data from and send data to any other FPGA unit, directly and/or via associated memory module(s) and/or storage, using one or more of the RCM control interface(s) 530, the RCM data routing module(s) 540, crosspoint switch(es) 520, the transceiver fabric(s) 510, and one or more of the busses 502, 512, 522, 524, 526, 528, 529, 532, and/or 542 of one or more FPGA fabric(s) 500.

Specifically, if an FPGA unit is a single partition 560 of an FPGA fabric 500 implemented by a device 224a or 226a (shown in FIG. 2), that FPGA unit can exchange data, directly and/or via the associated memory module(s)/storage, with any other partition(s) 560 (i.e., FPGA unit(s)) of the same FPGA fabric 500 implemented by the device 224a or 226a, and/or with any partition(s) 560 (i.e., FPGA unit(s)) of a different FPGA fabric 500 implemented by a different device, e.g., any of 224b-d and/or 226b-d. Similarly, if an FPGA unit is a group of partitions 560 of an FPGA fabric 500 implemented by a device 224a or 226a, that FPGA unit can exchange data, directly and/or via the associated memory module(s)/storage, with any other group(s) of partitions 560 (i.e., FPGA unit(s)) of the same FPGA fabric 500 implemented by the device 224a or 226a, and/or with any other group(s) of partitions 560 (i.e., FPGA unit(s)) of a different FPGA fabric 500 implemented by a different device, e.g., any of 224b-d and/or 226b-d.

It should be understood that even though FIG. 2 depicts a total of four RCMs 202 and two devices 224, 226 per RCM, and FIG. 5 depicts four partitions 560 per FPGA fabric 500, these numbers are illustrative only. In general, the total number of RCMs can be any number, e.g., from 1-12 or more, the number of devices per RCM can be any number, e.g., from 1-6 or more, and the number of partitions per device/FPGA fabric can also be any number, e.g., 1-8, or more. Also, different RCMs can include different numbers of devices and different devices/fabrics can include different numbers of partitions. An FPGA unit can be a single partition, a group of partitions, a single device, or a group of devices, and different FPGA units can be different in terms of the numbers of partitions included therein.

Techniques for Performing Primitive Tasks on Specialized Processors

Although various specialized processing modules can execute certain operations/tasks efficiently, third-party libraries for executing such tasks using specialized processing modules are generally not available. One reason is conventional compilers/interpreters that are used to compile/interpret the application developer's code (or a portion thereof) for execution on a general purpose processor cannot compile code such as a third-party library available in source code format for execution by a specialized processor. If a third-party library is provided in the object code form that is suited for the specialized processor, generally such object code cannot be linked with the object code compiled for a general purpose processor.

A software developer may leverage a specialized processor's resources by designing and implementing customized modules to perform specified functions on the specialized processor's hardware. Developing such customized modules may require the use of tools (e.g., programming languages, compilers, circuit synthesis tools, place-and-route tools, etc.), and/or may require comprehensive knowledge and understanding of the specialized processor's architecture. The investment of time and effort required to become familiar with new tools and devices can be costly, and therefore can impede the use of specialized processors and/or drive up the cost of software development.

The development and distribution of libraries of modules for a specialized processor may reduce the barriers to adoption of the device. If a software developer wishes to use a library module, the developer may do so by integrating the module into the developer's software. Integrating such a module into high-level source code for a general-purpose processor, however, may require the developer to write additional code to control the movement of data back and forth between the specialized processor and the general-purpose processor, to configure the specialized processor to implement the task associated with the module, and/or to communicate with the specialized processor. Although such integration efforts may require less use of unfamiliar development tools and/or less knowledge of the specialized processor's architecture, the investment of time and effort required to integrate a library module for a specialized processor into high-level source code may still impede the use of the specialized processor and drive up the cost of software development. Thus, there is a need for improved techniques for integrating specialized processor functionality into high-level source code.

This section of the present disclosure describes techniques for exposing data-processing tasks (e.g., "primitives") that can be performed by a specialized processor, to software developers. In various embodiments, primitive libraries and APIs to various primitives are provided to an application developer. The primitives can be used to configure the specialized processing modules, and may be customized according to the architecture of such modules. Although such primitives cannot be compiled with the application developer's source code and also cannot be linked to the object code obtained by compiling the application developer's source code, the APIs to such primitives can be compiled with the application developer's source code, to obtain an executable.

The APIs themselves do not provide, however, the functionality associated with the primitives and can only identify the primitives and data required and/or supplied by such primitives. Therefore, when the executable of the software application incorporating the APIs is run on a computing system that includes both a general purpose processor and the specialized processing module, a configuration mechanism can control loading of the primitives and/or execution thereof using the specialized processors, when needed. Moreover, a specialized storage node manager can facilitate data exchange between the specialized processing module and the data storage, without relying on the general purpose processor executing the software application.

In some embodiments, these techniques can reduce the investment of time and effort required to invoke the functionality of a specialized processor, thereby facilitating adoption of specialized processors and/or reducing the cost of software development for systems that include specialized processors. This can also result in improved performance of the software applications.

A computer program interface system is described, comprising a storage module and an application program interface (API). The storage module includes a primitive, which includes a representation of a task. The task representation is executable, at least in part, on a first field programmable gate array (FPGA) processor of an FPGA module. The task representation also references one more data elements corresponding to data associated with the task. The one or more data elements are stored in a file accessible to the first FPGA processor via an FPGA-based storage node manager and independently of any operating system (OS) provided data access function. The API identifies the primitive, the corresponding task, and the one or more data elements.

A method for executing a software program using a field programmable gate array (FPGA) module is described. The software program includes an application program interface (API) call to a primitive. The primitive is executable on an FPGA processor. The method includes executing the API call on a non-FPGA processor. The method further includes, in response to the execution of the API call, loading on and executing by a first FPGA processor of the FPGA module at least a portion of a primitive comprising a representation of a task. The method further includes accessing by the first FPGA processor a first data element corresponding to data associated with the task and stored in a file in a first storage module. The first data element is accessed via a first FPGA-based storage node manager and independently of any operating system (OS) provided data access function.

Primitives and Primitive Libraries

In some embodiments, one or more primitives may be provided for a computing system that includes a specialized processor (e.g., a reconfigurable computing system having one or more RCMs). Any suitable data-processing task may be implemented as a primitive, including, without limitation, searching (e.g., exact match searching or fuzzy searching), counting (e.g., determining term frequency), sorting, data compression, data encryption, image processing, video processing, speech/audio processing, statistical analysis, and/or solution of complex systems involving matrices and tensors, etc. Specialized processors may include, without limitation, reconfigurable computing devices, graphics processing units (GPUs), network processors (NPs), physics processing units (PPUs), co-processors, application-specific integrated circuits (ASICs), application-specific instruction-set processors (ASIPs), digital signal processors (DSPs), and/or any other suitable processing device configured to perform one or more particular tasks or task types.

A primitive, in general, includes a representation of a task that can be executed by a specialized processor. To this end, the representation includes instructions/data for adapting or configuring the specialized processor to perform the primitive task. Suitable representations of primitive tasks may include, without limitation, a configuration file for reconfiguring a reconfigurable computing device to perform the primitive task, and/or control parameters suitable for adapting a specialized processor to perform the primitive task. In some embodiments, a configuration file for reconfiguring a reconfigurable computing device is derived from a hardware description (e.g., a register-transfer level description, a gate-level description, etc.) of the task. The hardware description typically describes circuitry for implementing the task and/or control parameters and/or instructions for adapting a specialized processor to perform a particular task. Such hardware description can be provided using any suitable language, including, without limitation, a hardware description language (HDL) (e.g., VHDL or Verilog) and/or System C, etc.

In various embodiments, a primitive's representation may reference a data element that corresponds to data associated with the primitive task, and the data may be stored in a storage device. In some embodiments, the storage device may be accessible to the specialized processor and to a general-purpose processing device, as well. In various embodiments, the storage device is accessible to the specialized processor via a specialized-processor-based storage node manager (e.g., hardware-based storage node manager 132, 232, or 332 as illustrated in FIGS. 1-3), without invoking the data access functions of an operating system. The specialized-processor-based storage node manager may, however, access the data via a memory controller or other suitable processing device that is integrated with the storage node manager and/or is integrated with the storage device on which the data is stored and/or controls the operation of such a storage device.

In some embodiments, execution of a primitive by a specialized processor may be initiated by a specialized configuration module, a resource manager, or by another processing device (e.g., a general-purpose processing device). The other processing device may not, in some embodiments, manage (e.g., control or direct) the primitive's execution after the initiation thereof.

In some embodiments, a specialized processor executing a primitive may use different bit widths for different types of operands. For example, a specialized processor may use a first number of bits for storing, transmitting, and/or processing operands of a first type, and use a second number of bits for storing, transmitting, and/or processing operands of a second type. By doing so, the specialized processor may improve storage efficiency, bus utilization, and/or data processing efficiency relative to processing devices in which all data is stored, transmitted, and/or processed using the same bit width (e.g., 64 bits).

In some embodiments, a primitives library is provided for performing one or more primitive tasks using specialized processor(s). Application program interfaces (APIs), to the primitives in a primitives library may expose one or more interface elements corresponding to respective primitives. In some embodiments, the interface element corresponding to a primitive may include a software construct (e.g., a high-level language construct). A software developer may include such a software construct in source code (e.g., high-level source code) of an application to configure a specialized processor to perform a corresponding primitive and/or to initiate execution of the corresponding primitive on the specialized processor. Any suitable software construct may be used to interface to a primitive, including, without limitation, a function call and/or any other suitable high-level language construct. The APIs can be provided in an API library.

In some embodiments, the API for a primitive may identify the primitive (e.g., a unique identifier associated with the primitive, or the address of the primitive in storage or in a file), the task performed by the primitive (e.g., searching), and/or one or more data elements accessed by the primitive task.

In some embodiments, the use of a primitives library may facilitate invocation of primitives in high-level source code, compilation of high-level source code that invokes primitives, and/or linking of software that invokes primitives to corresponding representations of primitive tasks. In some embodiments, a primitive may be invoked in source code by calling a corresponding function exposed by the primitives library API. During compilation, the function call may be compiled in the same manner as any other function call. During linking, the function call may be linked with a task representation suitable for performing the corresponding primitive task on a specialized processor.

In some embodiments, the primitives library API may encapsulate aspects of primitives, such that these aspects are partially or completely hidden from the software developer. For example, the primitives library API may encapsulate communication between a general-purpose processing device and a specialized processor, the process of adapting (e.g., reconfiguring) a specialized processor to perform a primitive task, and/or the primitive task's implementation on the specialized processor.

Encapsulating aspects of primitives may facilitate development of software that uses primitives by reducing the burden on the software developer. For example, a software developer invoking a primitive through the primitives library API may be unaware that the primitive task is performed by a specialized processor, or unaware of the architecture of the specialized processor performing the primitive task. Also, encapsulating a primitive's implementation may facilitate the development of primitives. In some embodiments, a primitive developer may change the implementation of a primitive (e.g., to make better use of a specialized processor's resources) and/or add different implementations of a primitive (e.g., for different specialized processors), and the new primitive implementations may be linked to existing source code without requiring modifications of the existing source code.

A primitives library API may be specified in any suitable programming language, including, without limitation, C programming language, C++ programming language, PYTHON® programming language, SCALA® programming language, R programming language, or JAVA® programming language. When a primitives library is implemented in C programming language or C++ programming language, source code developed in C programming language or C++ programming language may access the primitives library using native features of the language, and source code developed in many other high-level languages (e.g., PYTHON® programming language, SCALA® programming language, R programming language, or JAVA® programming language) may seamlessly bind to the primitives library. Thus, implementing a primitives library in C programming language or C++ programming language may make the primitives library widely accessible to software developers using a wide variety of programming languages and development tool chains.

It should be understood however, that in general a primitive API encapsulates an implementation of a primitive, which can be customized according to a computing system having one or more specialized processors. The primitive API may be specified in any suitable language, referred to as primitive API language. A developer may invoke that primitive via the corresponding API in a system specification provided in a system-specification language, so that the primitive implementation is incorporated into the specified system. The systems-specification language can be the same as the primitive API language, or can be a different language if a compiler for the system-specification language permits invocation of APIs specified in the selected primitive API language. If such a compiler is available, any presently used or future developed programming/scripting language can be selected as the primitive API language, system-specification language, or both.

The remainder of this section of the present disclosure describes tool chains for developing software for specialized-processor-equipped computing systems, and techniques for performing primitive tasks on specialized processors.

A Software Development Tool Chain

Figure 6:
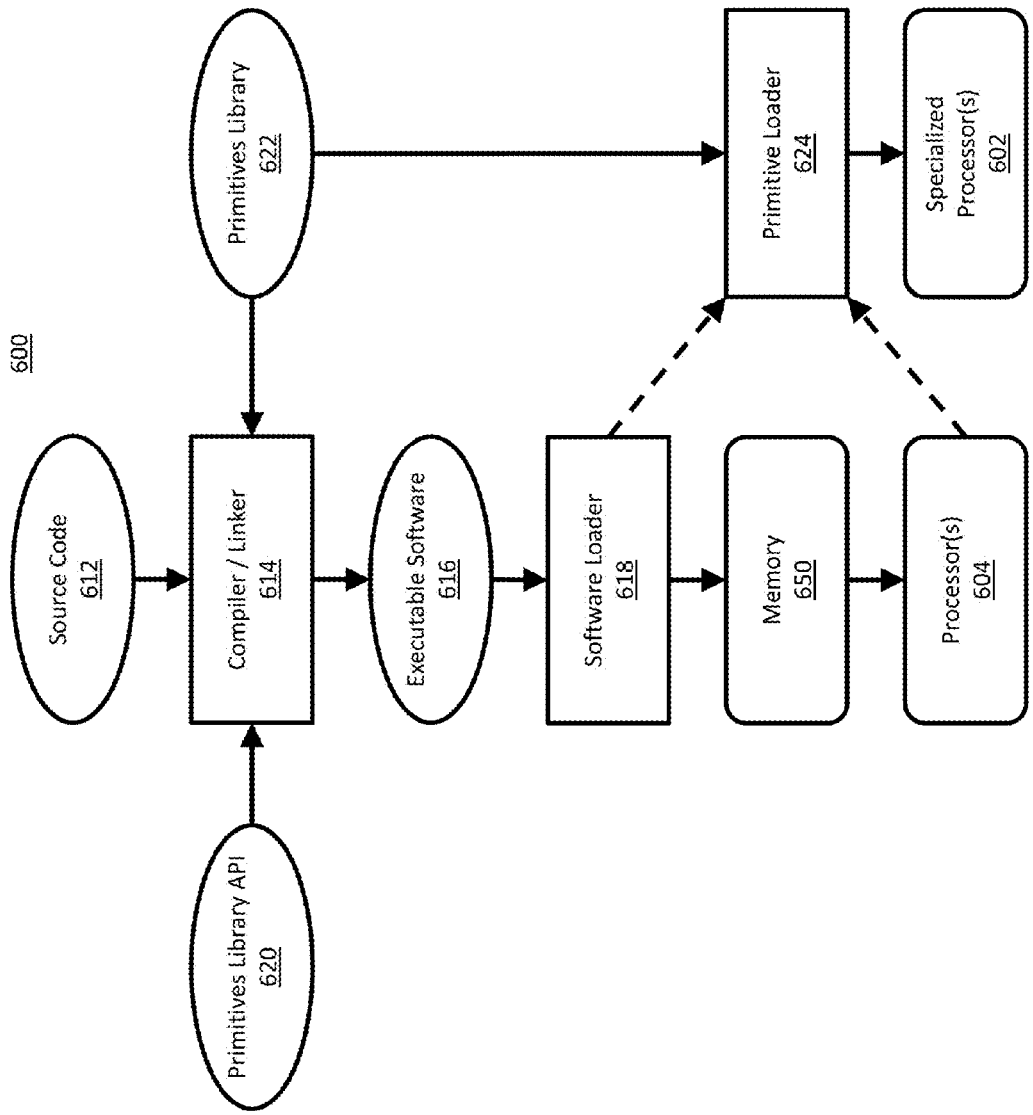
FIG. 6 is a block diagram of a software development tool chain for a computing system comprising a specialized processor, in accordance with some embodiments.

FIG. 6 shows a process, also called a tool chain 600 for developing software for a computing system having one or more specialized processors. In various embodiments, the software development tool chain 600 includes a primitives library 622 and a library of primitives APIs 620 for interfacing to the primitives in the library 622.

An application developer can write source code for a particular software application that requires performing one or more specialized tasks. For example, a data mining operation may require counting the number of unique values in a large data set, or a vulnerability detection application may need to determine if a certain signature is present in any of several large files. Typically, the application developer develops an algorithm to perform such tasks and then implements the algorithm by writing code therefor, which, when compiled, is typically executed by one or more general-purpose processors of a computing system.

Specialized processors, however, can be customized to perform various tasks (also called primitives or primitive tasks), including complex tasks and/or tasks that require processing large quantities of data. The primitives library 622 generally includes a collection of representation of such tasks, where the representation can adapt or configure a specialized processor to perform that primitive. Via the library of primitives APIs 620, the application developer can simply invoke one or more suitable primitives APIs in the source code 612, thereby minimizing the application developer's burden of having to implement several computation and/or data intensive tasks.

Moreover, while an application developer may know that the computing system executing the application includes one or more specialized processors, typically, the application developer lacks knowledge of the architecture of the specialized processor(s), e.g., the number of specialized processor(s), whether they have access to shared, local, and/or dedicated memory and/or access to other specialized processors, etc. Therefore, the application developer usually cannot implement the task/primitive to take full advantage of the available specialized processor(s). The representation of a primitive in the primitive library 622, however, is based on the knowledge of the architecture of the specialized processor(s) and, hence, execution of the primitive using the specialized processor(s) can improve overall system performance. Therefore, by invoking in the source code, via the library of primitives APIs 620, one or more primitives provided in the primitives library 622 the application developer can improve performance of the application.

A compiler/linker 614 can compile and link source code 612 that includes one or more interfaces in the library of primitive APIs, to generate executable software 616 that invokes one or more specialized-processor-based primitives. Tool chain 600 may include a software loader 618 for loading software 616 onto processing device(s) 604, and a primitive loader 624 for adapting a specialized processor 602 to implement the primitives invoked by software 616. Aspects of tool chain 600 are described in further detail below.

The source code 612 that may invoke one or more specialized-processor-based primitives may conform to any suitable programming paradigm, including, without limitation, the object-oriented, procedural, functional, and/or imperative paradigms. In some embodiments, source code 612 may include code expressed in any suitable programming language, including, without limitation, C programming language, C++ programming language, Objective C programming language, C# programming language, JAVA® programming language, JAVASCRIPT® programming language, PYTHON® programming language, PHP programming language, SQL programming language, SCALA® programming language, R programming language, and/or PERL® programming language, etc. The library of primitive APIs may provide APIs in various programming languages so that a suitable API can be used in the source code 612.

The API includes a reference to the corresponding primitive in the primitives library 622 and, during execution of the compiled API by the processor(s) 604, the processor(s) 604 or another controller can initiate the execution of the primitive by one or more specialized processor(s) (also called accelerator device(s)) 602. The compiler/linker 614 may include a conventional compiler/linker, including, without limitation, GNU's gcc or Intel's icc.

The compiler/linker 614 can compile and link an invocation of an API associated with a primitive provided in the primitives library 622 in a similar manner in which function calls and/or other library calls are compiled and linked. There are important differences, however, between a function (or other code construct/component) from a conventional library and a primitive from a primitives library. Specifically, in the case of the former, typically the processor executing other portions of the software also executes the function/component from the conventional library. Also, the function/component from the conventional library is usually customized/optimized for a general purpose processor executing the entire software. The primitives from a primitives library, however, are not executed by a general purpose processor executing other portions of the software application using the primitives. Moreover, the primitives are not customized/optimized for such processors. Instead, the primitives are customized for one or more special purpose processors that may provide only a limited functionality corresponding to one or more primitives in the primitives library 622.

To illustrate various steps of the process/tool chain 600 described above, the source code 612 may invoke a function "PrimitiveSearch (&Data, &Target)", where "PrimitiveSearch (string*Data, string*Target)" is an interface, exposed by the library of primitives APIs 620, to a search primitive. Compiler/linker 614 (e.g., gcc) may compile the invocation of "PrimitiveSearch" and link it to facilitate execution of a search primitive provided in the primitives library 622. The search primitive may include a representation of a search task suitable for performing the search task on specialized processor(s) 602. To this end, the search primitive includes code for adapting the specialized processor(s) 602 to implement the search primitive (e.g., code for configuring the specialized processor(s) to implement the representation of the search task).

As described above, the API interface for a primitive may identify the primitive, the task performed by the primitive, and/or one or more data elements accessed by the primitive. The API interface may identify the primitive using any suitable technique. In some embodiments, the identity of the primitive may be derived based on the identifier of the API interface (e.g., "PrimitiveSearch" in the example of the preceding paragraph) and/or the data types of the parameters to the API interface (e.g., string* and string* in the preceding example). In other words, each primitives library API interface may have a unique signature derived from the API interface's identifier and/or parameters, and that unique signature can identify the corresponding primitive. In some embodiments, the API interface for a primitive may include a function call corresponding to the primitive.

The API interface can also identify the data element(s) accessed by the primitive. In some embodiments, the data type(s) of the API interface's parameter(s) are the data type(s) of the primitive's data element(s), and the address(es) of the primitive's data element(s) may be derived from the argument(s) to the API interface that are specified in the source code 612, and that are incorporated in the executable software 616.

Embodiments have been described in which source code 612 is transformed into executable software 616 by a compiler/linker 614. In some embodiments, source code 612 may include interpreted code, and tool chain 600 may include an interpreter for transforming the interpreted code into executable software.

A software loader 618 may load software 616 into a memory 650, which is accessible to processing device(s) 604 and may be dedicated to processing device(s) 604. In some embodiments, software loader 618 may send a request to primitive loader 624 to adapt specialized processor(s) 602 to implement one or more primitives referenced by executable software 616. Adapting specialized processor(s) 602 to implement primitives invoked by software 616 at the time processor(s) 604 load the software may be advantageous, at least in the sense that the specialized processor(s) 602 may already be configured to perform a primitive task at the time processor(s) 604 execute the API corresponding to the primitive. In some embodiments, primitives loader 624 may include a resource manager 110 of a reconfigurable computing system 100, or a component thereof (e.g., a reconfiguration controller).

In some embodiments, after software 616 begins executing on processor(s) 604, the processor(s) may request that the primitive loader 624 adapt specialized processor(s) 602 to implement one or more primitives referenced by the software 616. Dynamically adapting specialized processor(s) 602 to implement primitives invoked by software 616 while the software executes may be advantageous, at least in circumstances where it is not feasible to adapt specialized processor(s) 602 to implement one or more of the primitives referenced by the software at the time the software is loaded. Software 616 may, for example, contain references to more primitives than can be simultaneously implemented on the available specialized processor(s). As another example, specialized processor(s) 602 may be performing other tasks at the time software 616 is loaded.

The primitive loader 624 may adapt specialized processor(s) 602 to implement one or more primitives included in primitives library 622. In some embodiments, adapting the specialized processor(s) requires communicating with one or more controllers to set parameter values that affect the operation of the specialized processor(s). In some embodiments, the specialized processor(s) include one or more reconfigurable computing module(s), and adapting the RCM(s) may involve communicating with a reconfiguration controller to reconfigure the RCM(s) to implement a representation of a primitive task (e.g., by loading FPGA configuration file(s) onto an RCM's FPGA(s)).

Techniques for Performing Primitive Tasks on Specialized Processors

Figure 7:
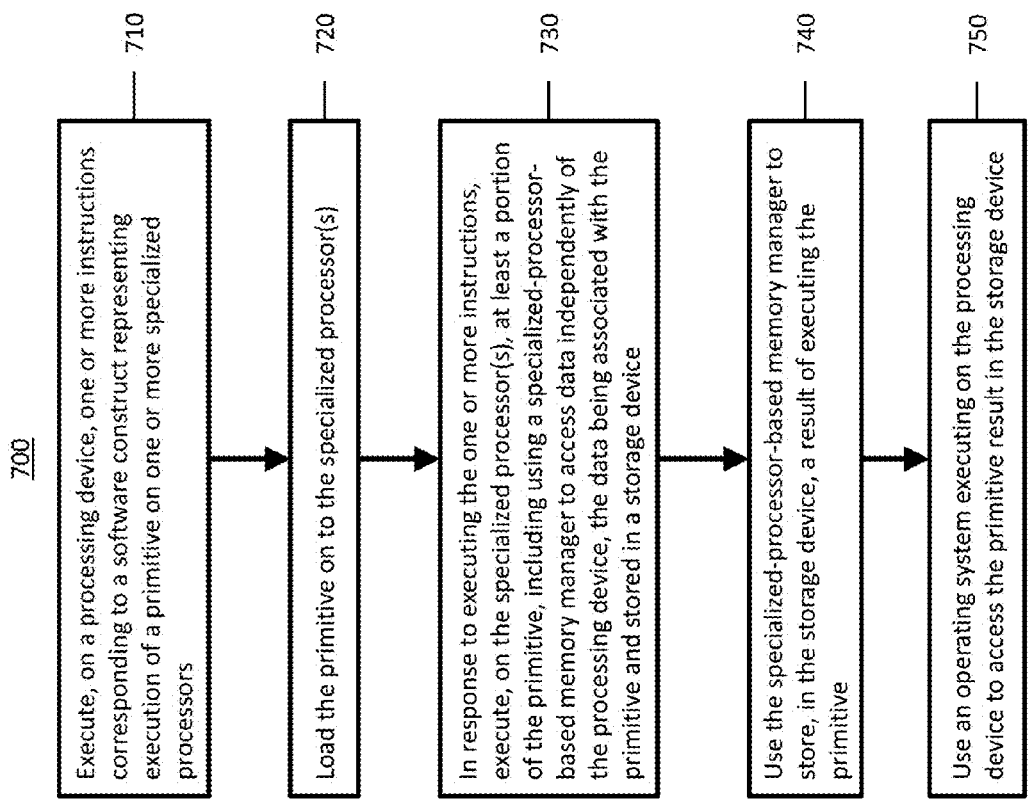
FIG. 7 shows a flowchart of a method for performing a primitive task on a specialized processor, in accordance with some embodiments.

FIG. 7 illustrates a method 700 for performing a primitive task on a specialized processor, according to some embodiments. In step 710, a processing device executes one or more instructions corresponding to a software construct. The software construct represents execution of a primitive task on a specialized processor. Generally, the software construct includes an invocation of a primitives library API interface (e.g., a function call to a primitives library API function).

In step 720, the primitive is loaded onto one or more specialized processors. Loading the primitive generally includes adapting the specialized processor(s) to perform the primitive task. Alternatively, or in addition, loading the primitive may include loading at least a portion of the primitive's input data from a storage device (e.g., storage 108 as shown in FIG. 1) into a memory accessible to the specialized processor(s) (e.g., memory 106 as shown in FIG. 1).

As described above, the specialized processor(s) may be adapted to perform the primitive task before the processing device invokes the API interface corresponding to the primitive (e.g., when the software that references the API interface is loaded), or may be adapted to perform the primitive task in response to the processing device executing the API. To adapt the specialized processor(s), the processing device may send a suitable request to the specialized processor(s) (e.g., to resource manager 110 as shown in FIG. 1). In general, adapting the specialized processor(s) may include setting parameters that control the operation of the specialized processor(s), loading software onto the specialized processor(s), and/or reconfiguring the hardware of the specialized processor(s). In some embodiments, adapting the specialized processor(s) includes reconfiguring one or more reconfigurable devices (e.g., RCMs 102 as shown in FIG. 1) to perform the primitive task. Reconfiguring an RCM to load a primitive may include configuring the RCM logic fabric to implement data-processing operations of the primitive task, and/or reconfiguring the RCM bus fabric to manage data flow.

The primitive task may be apportioned among the specialized processors in a number of ways. For example, a single specialized processor may be adapted to perform the primitive task. In some embodiments, several specialized processors are adapted to perform the primitive task. For example, one specialized processor may be adapted to perform one portion of the primitive task, and another specialized processor may be adapted to perform another portion of the primitive task. In cases where a number of specialized processors are adapted to perform the primitive task, the specialized processors may be adapted to perform the task in data-parallel fashion, with different specialized processors handling different subsets of the input data, or in any other suitable way.

In step 730, in response to the processing device invoking the API interface, the specialized processor(s) perform at least a portion of the primitive task. Performing a portion of a primitive task may include using a specialized-processor-based storage node manager to access data ("primitive data") independently of the processing device. In some embodiments, the primitive data may be stored in a storage device accessible to both the specialized processor(s) (e.g., specialized processor(s) 602 shown in FIG. 6) and the processing device (e.g., the processor(s) 604 shown in FIG. 6). In some embodiments, the address(es) of the primitive data may be passed as arguments to the API interface, or may be derived from the arguments passed to the API interface. In some embodiments, the address(es) of the primitive data may be communicated to the specialized processor(s) in response to the processing device invoking the API interface corresponding to the primitive.

Any suitable specialized-processor-based storage node manager may be used to access the primitive data, including, without limitation, a hardware-based storage node manager 132, 232, or 332 as described above with reference to FIGS. 1-3. In some embodiments, the specialized-processor-based storage node manager may be implemented on the same specialized processor that performs the primitive task. In some embodiments, the specialized-processor-based storage node manager may be implemented on a specialized processor that is different from any of the specialized processor(s) performing the primitive task. In some embodiments, the specialized processor(s) performing the primitive task may include several specialized-processor-based storage node managers (e.g., one storage node manager per specialized processor).

In some embodiments, the primitive data may include at least two data elements with different bit widths (e.g., an array of 32-bit identifiers and a parallel array of 4-bit codes). The specialized-processor-based storage node manager may be configured to access and/or process two or more data elements with different bit widths in parallel, thereby making efficient use of storage, communication, and/or processing resources.

In step 740, the specialized-processor-based storage node manager may store one or more results of the primitive task in a storage device. In some embodiments, the storage device may be accessible to the processing device that executed the primitive API (i.e., the processor(s) 604 shown in FIG. 6). In some embodiments, the specialized-processor-based storage node manager may store the results of the primitive task in the storage device independently of the processing device and/or any other processor. In step 750, the general purpose processing device accesses the primitive task's stored result(s) through an operating system, so that a software application executed by such processing device (e.g., the processor(s) 604) can use the results generated by the specialized processor(s).

Figure 8:
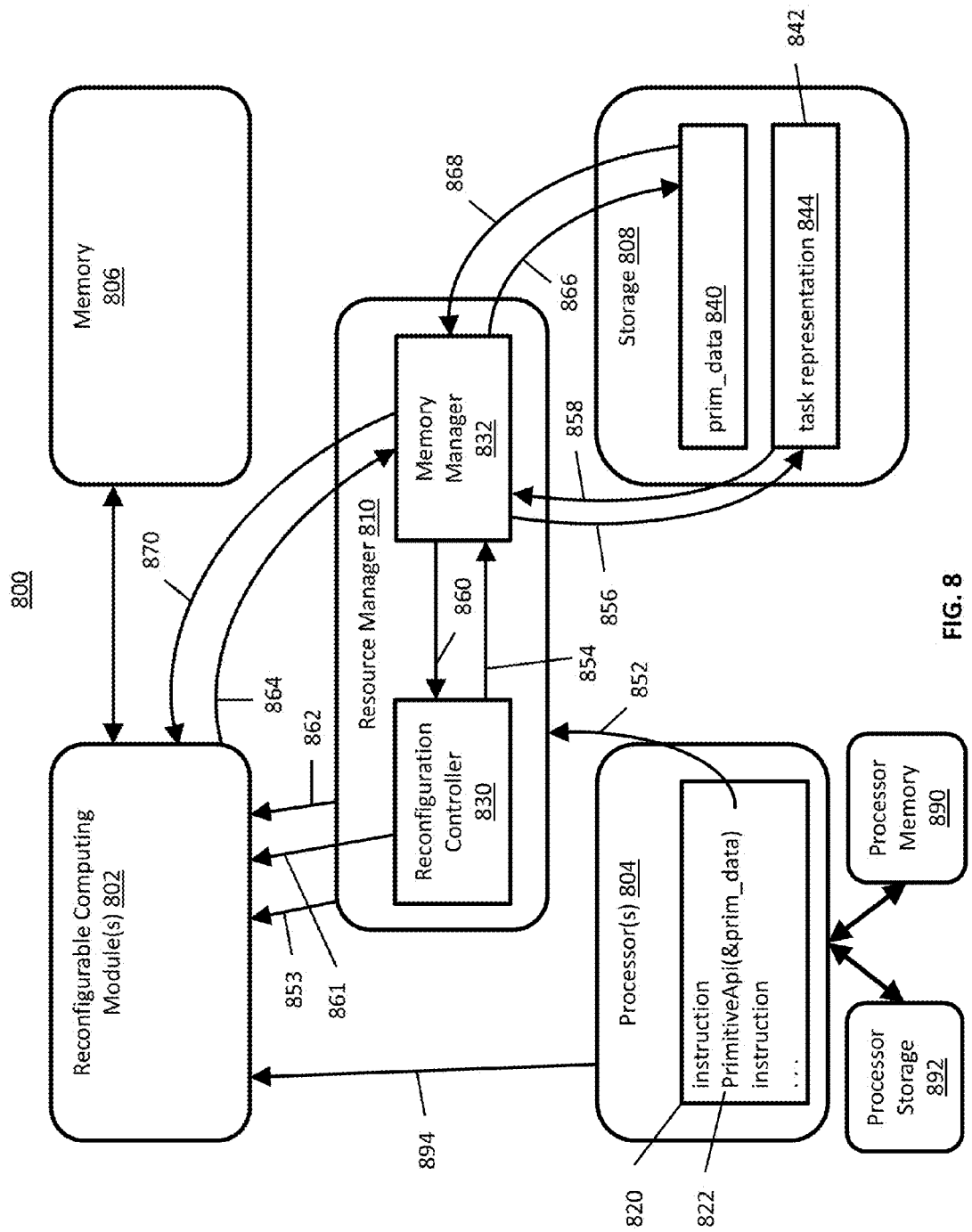
FIG. 8 is a data flow diagram illustrating a method for performing a primitive task on a reconfigurable computing system, in accordance with some embodiments.

FIG. 8 illustrates a method for performing a primitive task on a computing system 800, according to some embodiments. In particular, FIG. 8 shows how, in some embodiments, the components of a computing system 800 interact with each other to implement a method for performing a primitive task. The computing system 800 includes one or more reconfigurable computing modules (RCMs) 802, memory 806, storage 808, one or more processors 804, and a reconfigurable computing resource manager 810, which may include a reconfiguration controller 830 and a storage node manager 832. Some embodiments of these components are described above with reference to FIGS. 1-4. For brevity, these descriptions are not repeated here.

The method of FIG. 8 may include one or more of steps 852-870. At step 852, processor 804 executes a compiled API 822 corresponding to a primitive task. In response, at step 853, resource manager 810 determines whether RCM(s) 802 are already configured to implement the primitive task. At steps 854-860, reconfiguration controller 830 uses storage node manager 832 to retrieve a representation 844 of the task from storage 808. Alternatively or in addition, the reconfiguration controller may rely on the operating system to access the task representation 844 from the storage 808, from processor memory 890 (e.g., memory 250 shown in FIG. 2), and/or from processor storage 892 (e.g., storage 260 shown in FIG. 2). At step 861, reconfiguration controller 830 reconfigures reconfigurable computing module(s) 802 to implement the task representation 844. At step 862, resource manager 810 instructs RCM(s) 802 to begin performing the primitive task. Alternatively, at step 894, processor 804 instructs RCM(s) 802 to begin performing the primitive task. The computing module(s) then perform the task, which includes using storage node manager 832 in steps 864-870 to retrieve the task's input data 840 from storage 808. Some embodiments of steps 852-870 for performing a primitive task on a reconfigurable computing system 800 are described in further detail below.

At step 852, while executing instructions of software 820, processor 804 executes a compiled API 822 to a primitive. In one example, the API 822 includes a function call "PrimitiveApi", and the argument to the function call is the address in storage 808 of a data element "prim_data". In response to invocation of API primitive interface 822, processor 804 sends a request to resource manager 810 for RCM(s) 802 to perform the corresponding primitive task with the specified data.

A request to perform a primitive task may identify the primitive and/or the primitive data using any suitable technique. In some embodiments, the primitives in primitives library 842 may have unique identifiers, and the request may include the unique identifier of the requested primitive. In some embodiments, the request may include the address (e.g., in storage 808 or within the primitives library) of the requested primitive or a portion thereof (e.g., a complete or partial representation of the primitive task), and/or the primitive data.

In response to receiving a request to perform a primitive task, resource manager 810 may determine, at step 853, whether the RCM(s) 802 are configured to perform the requested primitive task. If the resource manager determines, in step 853, that the RCM(s) are not configured to perform the requested primitive task, the resource manager may use resource configuration controller 830 to reconfigure the RCM(s) 802 to implement the requested primitive.

In particular, reconfiguration controller 830 may reconfigure the RCM(s) 802 to implement a representation of a primitive task corresponding to the requested primitive. Reconfiguration controller 830 may obtain the primitive task representation 844 using any suitable technique. In some embodiments, reconfiguration controller 830 may receive the primitive task representation from processor 804 (e.g., when processor 804 invokes the primitive's API interface). In some embodiments, reconfiguration controller 830 uses the information identifying the requested primitive to obtain the primitive task representation 844 from storage 808, processor memory 890, and/or processor storage 892.

A technique for obtaining a primitive task representation 844 from storage 808 may include steps 854-860. In step 854, reconfiguration controller 830 may instruct storage node manager 832 to load the task representation corresponding to the requested primitive. In some embodiments, a primitives library file 842 associated with the requested primitive may be stored in storage 808. In steps 856-858, storage node manager 832 may request and receive the portion of the primitives library file 842 containing the requested primitive task representation 844. In some embodiments, the primitives library file and the primitives contained therein may be accessible to storage node manager 832 independently of any other processing device. In step 860, storage node manager 832 may return the requested task representation 844 to reconfiguration controller 830.

In step 861, reconfiguration controller may use primitive task representation 844 to reconfigure the RCM(s) 802 to implement the requested primitive. In some embodiments, a single RCM may be configured to implement the primitive. In some embodiments, several RCMs may be configured to implement the primitive, with the primitive being implemented in part on one RCM and in part on at least one other RCM.

After resource manager 810 reconfigures the RCM(s) 802 to perform the requested primitive task, the resource manager may, in step 862, initiate execution of the primitive task on the RCM(s). Alternatively, if the resource manager determines, in step 853, that the RCM(s) are configured to perform the requested primitive task, the resource manager may, in step 862, initiate execution of the primitive task on RCM(s) 802. In some embodiments, instead of resource manager 810 initiating execution of the primitive task in step 862, processor 804 may initiate execution of the primitive task on the RCM(s) in step 894.

During execution of the primitive task, RCM(s) 802 may access data stored in storage 808, including, without limitation, the data "prim_data" identified in the invocation of the primitive interface. In step 864, the RCM(s) 802 may instruct storage node manager 832 to load specified data (e.g., prim_data 840). In steps 866-868, storage node manager 832 may request and receive the specified data from storage 808. In various embodiments, the specified data is accessible to storage node manager 832 independently of any other processing device. In step 870, storage node manager 832 may send the specified data to RCM(s) 802.

As the foregoing example demonstrates, in some embodiments, a primitive representation and data accessed by the primitive may be stored in the same storage module (e.g., in the same storage device). For example, a primitives library file containing the primitive and a data file containing data accessed by the primitive may be stored in the same storage module. In some embodiments, the primitive and its data may be stored in different storage modules.

As the foregoing example further demonstrates, one or more RCMs 802 may be configured to implement a primitive before the API interface to the primitive is invoked by processor 804. In some embodiments, reconfiguration controller 830 may reconfigure the RCM(s) to implement a specified primitive in response to the loading of software that references the primitive, in response to processor 804 executing an instruction directing the reconfiguration controller to reconfigure the RCM(s), and/or in response to any other suitable event.

In the foregoing example, a hardware-based storage node manager 832 is used to retrieve data associated with a primitive. In some embodiments, the same reconfigurable computing module may implement at least a portion of hardware-based storage node manager 832 and at least a portion of the specified primitive. In some embodiments, different RCMs may implement hardware-based storage node manager 832 and the specified primitive. In some embodiments, each one of several RCMs may implement a respective specified primitive, and each RCM may implement a respective hardware-based storage node manager or a portion of a common hardware-based storage node manager. In various embodiments, during the execution of a primitive, the RCM(s) 802 may access the memory 806 directly, without using the storage node manager 832 and/or any other processor (except that integrated with the memory 806), e.g., to store partial results. The data retrieved from the storage 808 by the storage node manager 832 (e.g., prim_data 840) may be cached in the memory 806, and may be accessed therefrom by the RCM(s) 802. The memory 806 may include one or more memory modules accessible only by the RCM(s) 802, one or more memory modules that can be accessed only by the processor(s) 804, and one or more memory modules that can be accessed by both the RCM(s) 802 and the processor(s) 804.

Techniques for Managing Execution of Tasks by Specialized Processors

The present disclosure describes techniques for adapting a specialized processor to perform primitive chaining, a technique whereby the specialized processor not only performs data-intensive computations associated with a primitive but also manages control/data flow between or among subtasks associated with the primitive. In some embodiments, a specialized processor may manage control and/or data flow between or among various specialized processing units for parallel, sequential, partially parallel and partially sequential, and/or conditional execution of subprimitives, i.e., subtasks associated with a primitive.

Reconfigurable Primitive Chaining

Figure 9A:
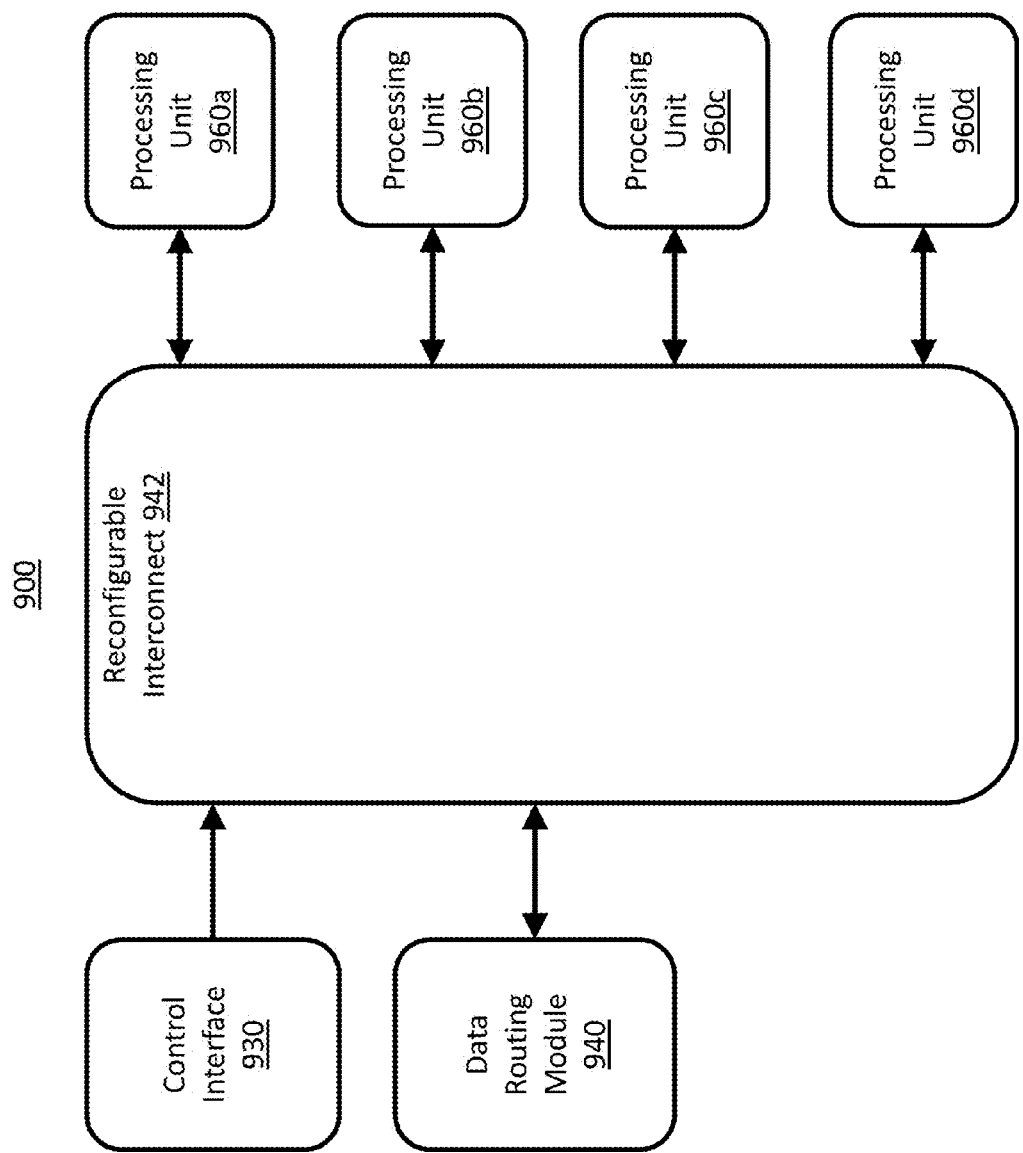
FIG. 9A is a block diagram of a reconfigurable bus fabric in a specialized processor in accordance with some embodiments.

In some embodiments, a specialized processor uses a controller and reconfigurable interconnects to coordinate the execution of two or more subprimitives that are related to a primitive, i.e., the primitive to be implemented using chained subprimitives. Referring to FIG. 9A, a specialized processor 900 may include a control interface 930 (e.g., RCM control interface 530 as shown in FIG. 5), a data routing module 940 (e.g., RCM data routing module 540 as shown in FIG. 5), a reconfigurable interconnect 942 (e.g., data interconnect 542 as shown in FIG. 5), and processing units 960 (e.g., reconfigurable processing partitions 560 as shown in FIG. 5). The reconfigurable interconnect 942 may include a reconfigurable bus fabric and/or any other reconfigurable interconnection circuitry such as multiplexers, switches, concatenators, etc. The control interface 930 can configure the reconfigurable interconnect 942 such that the processing units 960 can operate in a selected mode including a parallel mode, a sequential mode, a partially parallel-partially sequential mode, and a conditional mode. The data routing module 940 can route data between a processing unit 960 and other devices (e.g., a storage device, a storage node manager, etc.), and/or between two or more processing units (e.g., between processing units 960b and 960c) using the reconfigurable interconnect 942 configured according to a selected mode. Examples of parallel, sequential, and conditional mode operations are described below with reference to FIGS. 9B-9D.

With reference to FIG. 9B, in the parallel mode, several processing units (e.g., processing units 960a-960d) are configured to operate in parallel, and the control interface 930 configures each processing unit to execute one of the subprimitives related to the primitive to be executed. As such, two or more sub primitives can be executed in parallel. During parallel operation, each processing unit can process the same data set or two or more processing units can process different respective data sets. The different data sets can be different parts of a larger data set. The processing units can access these data sets from one or more storage modules included in the specialized processor 900, such as the storage 108 that is included in the computing system 100 shown in FIG. 1, and/or from one or more external storage modules. To access data, a processing unit can use a storage node manager (e.g., a storage node manager 132, 232, or 332 illustrated in FIGS. 1-3) and may therefore not rely on a general-purpose processor and/or an operating system for data access. In various embodiments, the data routing module 940 can send data received from the storage module(s) to two or more processing units, in parallel. The data routing module 940 can also send data received from two or more processing units to the storage module(s), in parallel.

In some embodiments, one or more processing units can read data from and/or write date to one or more local memory modules (e.g., the memory modules 206 shown in FIG. 2) that are included in the specialized processor 900. The local memory module(s) can be shared between several processing units. Alternatively, or in addition, a local memory module may be dedicated to a particular processing unit. The local memory modules may be used to cache/buffer data to be exchanged with the storage module(s) and/or to store partial results during the execution of the subprimitive(s).

It should be understood that the embodiments described with reference to FIG. 9B are illustrative only. In general, a parallel configuration may be used to communicate data between one or more data routing modules and any number of processing units (e.g., fewer than four processing units, four processing units, or more than four, e.g., 5, 8, 10, 24, etc., processing units).

In some embodiments, a specialized processor may use one or more data routing modules to send the same data, in parallel, to several processing units implementing the same primitive. For example, two processing units may each implement a search primitive. To search the same dataset for two different query strings in parallel, the specialized processor may configure two processing units to implement a search primitive, and send the same dataset, in parallel, to both processing units. The two processing units may then search the same data for two different query strings in parallel.

In some embodiments, a specialized processor may use one or more data routing modules to send different datasets, in parallel, to various processing units implementing the same primitive. For example, two processing units may each implement a search primitive. To search a dataset for a query string, the specialized processor may send different portions of the dataset, in parallel, to the two processing units. The two processing units may then search the different portions of the same dataset for the same query string, in parallel.

In some embodiments, a specialized processor may use one or more data routing modules to send the same data, in parallel, to different processing units implementing different primitives. For example, one processing unit may implement a search primitive, and another processing unit may implement a count primitive. To search a dataset for a query string and to count the number of words in the dataset, the specialized processor may configure two processing units to implement the search and count primitives, respectively, and send the same data, in parallel, to both processing units. The two processing units may then search for the query string and count the number of words in the dataset, respectively, and in parallel.

To illustrate parallel mode operation, consider a primitive "search_string (name, File)" which can be used to identify one or more occurrences of a specified name "name" in a specified file "File_A." File_A can be a large file, e.g., a 110 MB file and, as such, to perform the search quickly, the four processing units of the system 900 can be configured as described above. Specifically, each processing unit 960a-960d can search for the same name in a different portion of File_A. Thus, different processing units execute the same subprimitive, i.e., search_string, but some of the data processed by each subprimitive (the respective portion of File_A), is different.

A general purpose processor executing a software application requiring the search results may identify File_A to the specialized processor 900, but may not send contents of the file to the specialized processor 900. Instead, the processing units can access the respective portions to be processed from the storage as described above. The searches within different portions of File_A (where, for example, a 32 MB portion is designated to each of processors 960a-960c, and a 14 MB portion is designated to processor 960d), can be performed in parallel. The results of the searches can be stored in local memory modules and/or in the storage, and/or may be supplied to the general purpose processor, using the data routing module 940.

In another example, a primitive "search_record (record, File)" is used to identify one or more occurrences of a specified record that includes a name and an address, in a specified file File_B. In this case, two processing units (e.g., 960a, 960c), can be configured such that the processing unit 960a searches for the name in File_B while the processing unit 960c searches for the address in File_B. Thus, the two subprimitives, search_name, and serach_address, are different, but some of the data processed by the two subprimitives (File_B) is the same. In this example, the data routing module 940 may send the entire File_B to each processing unit 960a, 960c.

The search for address can be subdivided further, using the processing units 960b and/or 960d, such that the processing units 960b and 960c, or processing units 960c and 960d, or all three processing units 960b-960d search for the address in a respective, designated portion of File_B. In this case, the data routing module may send the respective portions of File_B to the processing unit 960c and to the processing units 960b and/or 960d. In effect, the subprimitive "search_address" to be operated on File_B is further divided into two or three subprimitives "search_address" that are to be operated on two or three portions of File_B. Alternatively or in addition, the search for the name can also be parallelized using an additional processing unit.

The division of a primitive into two or more subprimitives and optional further division of one or more subprimitives into corresponding subprimitives, as illustrated above, may be specified in the primitive specification loaded by the specialized processor. Alternatively or in addition, the general purpose processor may be programmed to generate a hierarchy of subprimitives and/or the specialized processor may also generate a hierarchy of subprimitives. To this end, in some embodiments, the general purpose processor and/or the specialized processor may determine certain parameters of a specified primitive, such as number and/or types of arguments, size of data elements to be processed, etc. To illustrate, in the foregoing example, the argument "record" associated with the primitive "search_record" includes two arguments "name" and "address." A general purpose and/or specialized processor can use this information to determine that the primitive can be divided into two subprimitives.

The general purpose and/or specialized processor may also take into account one or more system parameters such as the number of processing units that are available to execute the specified primitive/subprimitive, the processing and/or input/output capacity of the available processing units, storage and/or input/output capacity of one or more storage nodes associated with respective processing units, storage of the one or more data elements associated with the primitive/subprimitive, etc., and may hierarchically divide a specified primitive into two or more subprimitives.

To illustrate, in the foregoing example, the general purpose and/or specialized processor may determine that to implement the "search_address" subprimitive, processing units 906b, 906c, 906d are available and that the data element File_B is stored in part on storage node(s) associated with the processing unit 906b and in part on storage node(s) associated with the processing unit 906c. Therefore, the general purpose processor and/or the specialized processor may subdivide the subprimitive "search_address (address, File_B)" into two subprimitives, namely, "search_address (address, Part_0_of_File_B)" and "search_address (address, Part_1_of_File_B)," even though, three processing units are available, at least in part because the processing units 906b, 906c may efficiently access respective portions of File_B from respective storage nodes associated therewith.

In another embodiment, the general purpose and/or specialized processors may subdivide the subprimitive "search_address (address, File_B)" into three subprimitives, each of the available processing units 906b, 906c, 906d executing one of the three subprimitives. The general purpose and/or specialized processors may select this configuration even though the data element File_B is stored on the storage nodes associated with the processing units 906b, 906c only, if the overall execution speed can be improved relative to using only two processing units. In this configuration, the data routing module 940 may be configured to send portions of File_B accessed from the storage nodes associated with the processing units 906b, 906c to the processing unit 906d.

In various embodiments, a parallel chain of subprimitives may be implemented entirely in parallel or partially in parallel. To implement a parallel chain of subprimitives entirely in parallel, a specialized processor may configure one or more processing units to implement all the subprimitives in parallel, with the reconfigurable interconnect routing data to the processing units in parallel. As described above, different processing units or groups of processing units may execute the same subprimitive or different subprimitives, and/or may process the same dataset and/or different datasets.

To implement a chain of subprimitives partially in parallel, a specialized processor may configure one or more processing units to implement in parallel one set of subprimitives related to a primitive, with the reconfigurable interconnect routing data to those processing units in parallel. When execution of one or more of the subprimitives in that set of subprimitives is completed, the specialized processor may reconfigure one or more processing units (or portions thereof) to implement in parallel another set of subprimitives that are also related to the primitive, and reconfigure the interconnect to route the appropriate data to the subprimitives of the other set. This process of implementing some of the subprimitives in parallel, then reconfiguring the processor and interconnect to implement additional subprimitives in parallel, may continue until execution of all of the subprimitives in the chain has been completed. As described above, any subprimitive may be divided further into other subprimitives, which may be executed in parallel or partially in parallel, as described above.

Figure 9C:
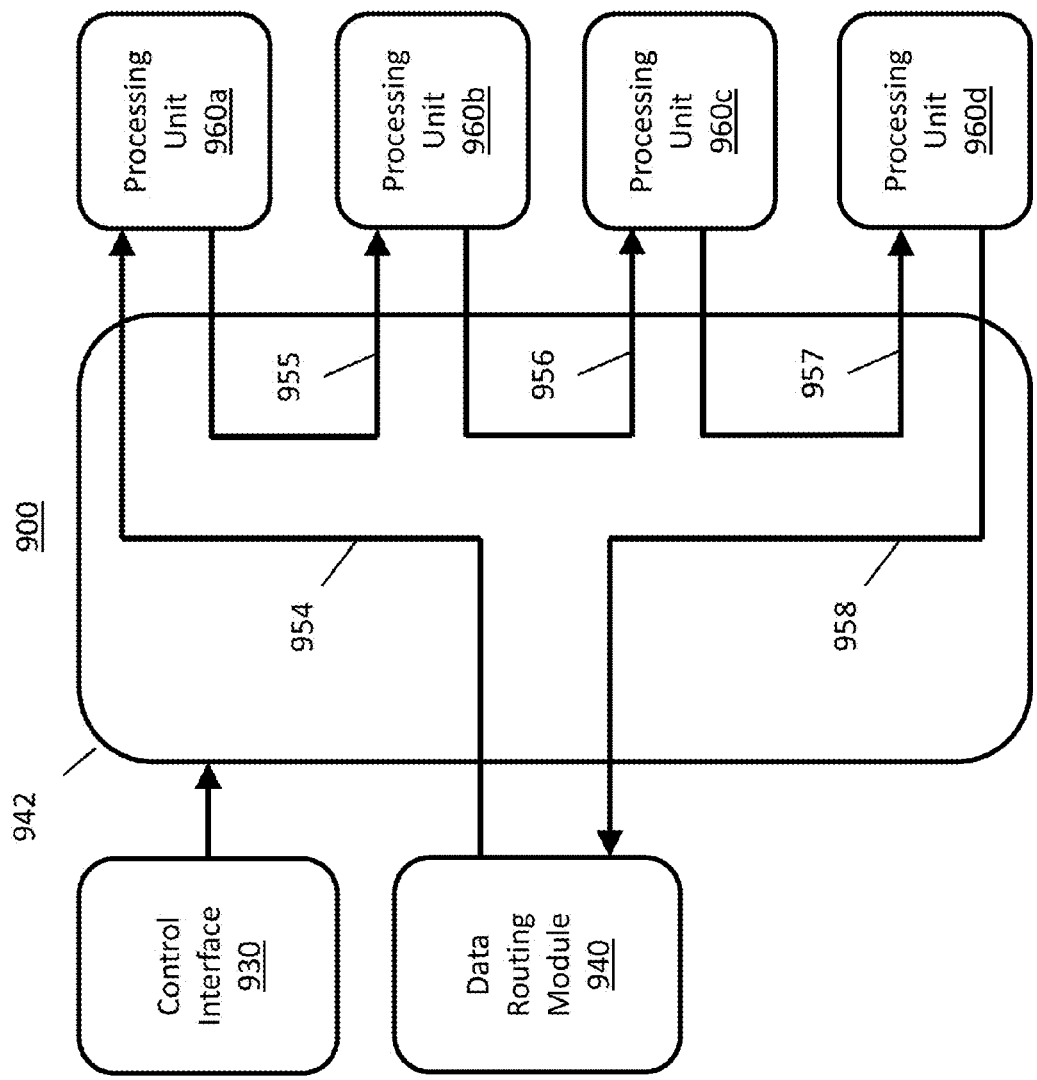
FIG. 9C is a block diagram of a reconfigurable bus fabric configured to facilitate sequential execution of primitives by a specialized processor, in accordance with some embodiments.

FIG. 9C shows processing units 960 and the reconfigurable interconnect 942 configured in a sequential mode. The data routing module 940 uses a portion 954 of the reconfigurable interconnect to route input data (e.g., the data accessed from a storage module), to a first processing unit 960a, routes intermediate data produced by the first processing unit 960a to a second processing unit 960b using a portion 955 of the interconnect, and so on. The data routing module 940 routes the result data produced by the last processing unit 960d back to the storage using a portion 958 of the reconfigurable interconnect. The sequential interconnect mode may facilitate sequential execution of primitives by processing units 960a-96d using portions of the reconfigurable interconnect 955, 956, 957. In some embodiments, the sequential mode can facilitate pipelined processing of data, with the individual processing units functioning as pipeline stages, and with the respective subprimitives related to a primitive determining the task performed by each pipeline stage.

Various embodiments of a specialized processor are not limited by the embodiment described with reference to FIG. 9C. A reconfigurable interconnect may be used to communicate data serially between any number of processing units (e.g., 2, 3, 6, 8, 10, 12, 32, etc.). One or more processing units 960 may store partial results in a shared or dedicated local memory and/or in the storage. Additionally or in the alternative, one or more processing units 960 may send such results to a general purpose processor executing a software application using the results of computations of the chained primitive.

In some embodiments, a specialized processor may use a sequential configuration to send data to a processing unit implementing a search primitive. Any records matching the search criteria of the first search primitive may be sent to a second processing unit implementing a second search primitive. For example, the first search primitive may search for records of people of a specified age, and the second search primitive may search the records of the people of the specified age for people living in a specified region. In this way, the specialized processor can implement multi-stage searching and/or filtering.

It should be understood that the embodiments described with reference to FIG. 9C are illustrative only. In general, a sequential configuration may be used to communicate data between one or more data routing modules and any number of processing units (e.g., fewer than four processing units, four processing units, or more than four, e.g., 5, 8, 10, 24, etc., processing units). One or more groups of processing units, each group having at least two processing units, can be configured to exchange data in a sequential manner. Other processing units in the specialized processor, however, may be configured to operate in a parallel manner. Thus, in various embodiments, sequential chaining can be combined with parallel chaining, to yield a partially sequential, partially parallel chain. Specifically, in such a chain, at least one processing unit consumes the results of at least one other processing unit. In addition, at least two processing units are chained in parallel, as described above.

Figure 9D:
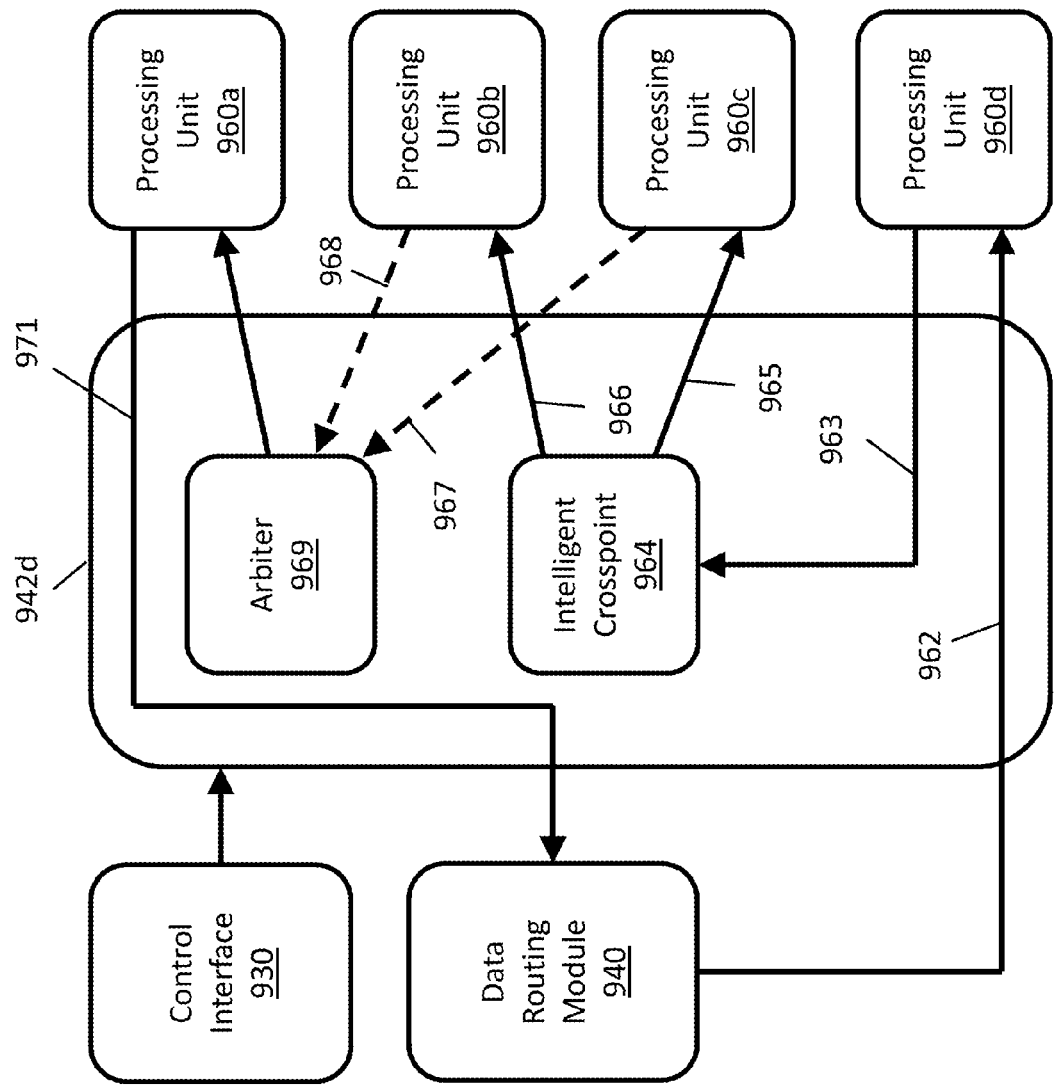
FIG. 9D is a block diagram of a reconfigurable bus fabric configured to facilitate conditional execution of primitives by a specialized processor, in accordance with some embodiments.

FIG. 9D shows processing units 960 and the reconfigurable interconnect 942 configured in a conditional mode. The control interface 930 determines which of two or more subprimitives, and the processing units configured to execute those subprimitives, receive based on a certain condition, results from another subprimitive. The control interface 930 may configure the interconnect to route data in selective manner to an appropriate processing unit based on the condition. Thus, in the conditional mode the specialized processor 900 can facilitate conditional execution of one or more subprimitives by one or more processing units 960. Various control flow constructs, including, without limitation, if-then, if-then-else, switch, unconditional branches, loops (e.g., count-controlled loops, condition-controlled loops, etc.), etc. can be implemented in a configuration of the processing units and the interconnect in the conditional mode.

With reference to FIG. 9D, in one example, the primitive chain includes, in a sequence, a first subprimitive, two subprimitives arranged in an if-then-else construct, and a fourth subprimitive. The data routing module 940 sends data to the processing unit 960d via interconnect 962. The processing unit 960d implements the first subprimitive, which generates intermediate data and sends the intermediate data to intelligent crosspoint 964 via interconnect 963. The intelligent crosspoint 964 determines whether to send the intermediate data to processing unit 960c (which implements the second subprimitive) via interconnect 965, or to processing unit 960b (which implements the third subprimitive) via interconnect 966, or to both processing unit 960c and processing unit 960d. The processing unit or units that receive the data from the intelligent crosspoint 964 implements the corresponding primitive to produce another intermediate data, and sends the other intermediate data to arbiter 969. Arbiter 969 then determines which input feed 967 or 968, or both, to forward to processing unit 960a. The processing unit 960a implements the fourth subprimitive, which generates result data, and sends the result data to data routing module 940 via interconnect 971.

It should be understood that the embodiments described with reference to FIG. 9D are illustrative only. In general, a conditional configuration may be used to exchange data according to one or more conditions, between one or more data routing modules and any number of processing units (e.g., 2, 3, 5, 8, 10, 24, etc., processing units). Conditional routing of data may be implemented using a crosspoint, an arbiter, and/or any other suitable routing device such as a multiplexor/demultiplexor, selector, etc. In some embodiments, conditional routing may be controlled by the value of a conditional expression, which can be data produced by a processing unit 960 or received from data routing module 940. In various embodiments, conditional chaining can be combined with parallel and/or sequential chaining. Specifically, in such a chain, at least one processing unit consumes the results of at least one other processing unit based on a condition. In addition, at least two processing units are chained in parallel or sequentially, as described above.

As in parallel chaining, in sequential and/or conditional chaining also, one or more subprimitives may be further divided into two or more subprimitives. The division of a primitive into two or more subprimitives and optional further division of one or more subprimitives into corresponding subprimitives may be specified in the primitive specification loaded by the specialized processor. Alternatively or in addition, the general purpose processor and/or the specialized processor may be programmed to generate a hierarchy of subprimitives using one or more parameters of a specified primitive and/or one or more system parameters, as described above.

A specialized processor may determine whether to implement a primitive chain entirely in parallel or partially in parallel based on any suitable criteria, including, without limitation, the resources occupied by each primitive, the resources available on the specialized processor, the parallelism within each primitive, results of profiled execution, locality of data access, user preferences, etc. This determination may be made statically (e.g., when the configuration file for the parent primitive is generated) or dynamically (e.g., at runtime).

In some embodiments, the specialized processor may select among alternative implementations of a primitive when determining whether to implement a primitive chain entirely in parallel, only partially in parallel, or entirely sequentially. The selection among the alternative implementations of a primitive may depend on the resources occupied by each implementation of the primitive and/or the performance (e.g., speed, power dissipation, etc.) of the various implementations.

When a primitive chain or a portion thereof is loaded, control interface 930 may reconfigure the configurable interconnect 942 to manage the execution of the processing units 960 (e.g., to implement parallel, sequential, and/or conditional configurations, as described above). In some embodiments, the control interface 930 may reconfigure the reconfigurable interconnect 942 at different times during the execution of the entire primitive chain, according to two or more modes. In some embodiments, the control interface 930 may simultaneously configure different portions of the reconfigurable interconnect in different modes. Configuring different portions of the reconfigurable interconnect in different modes can facilitate implementation of primitive chains having complex data/control flow structures.

Control interface 930 may reconfigure configurable interconnect 942 at any suitable time. In some cases, the control interface reconfigures the interconnect in response to the loading of one or more primitives (e.g., onto the processing units 960). In some cases, the control interface can reconfigure the interconnect after the execution of one or more subprimitives related to a primitive and before the execution of one or more other subprimitives that are also related to the primitive. In some embodiments, the reconfiguration of configurable interconnect 942 may be performed without relying a processor executing a software application that uses the primitive that is chained.

Data may be communicated between primitives using any suitable communication resource. Examples have been described in which data is communicated between primitives implemented on processing units via a reconfigurable interconnect coupled among the processing units. In some embodiments, two or more primitives may be implemented on the same processing unit 960, and the primitives implemented on the same processing unit may communicate via the processing unit's resources. For example, several primitives may be implemented on an FPGA processor, and the primitives implemented on the FPGA processor may use the FPGA's resources (including, but not limited to, reconfigurable interconnection resources) to communicate data between the primitives. In some embodiments, primitives may communicate via a storage node manager (e.g., hardware-based storage node manager 132, 232, or 332 illustrated in FIGS. 1-3). Such communication may be useful when the communicating primitives are not coupled to the same reconfigurable interconnect 942.

Invoking Primitive Chaining

Chaining of the subprimitives of a primitive may be achieved using any suitable technique, including, without limitation, e.g., by specifying the manner of chaining within the description of a primitive, by nesting the invocations of the subprimitives within the description/representation of a primitive, etc. In some embodiments, after a primitive is loaded, the specialized processor 900 can identify the related subprimitives and chaining thereof. For example, a primitive may require processing of a 120 MB file, and the task is dividable across different portions of the file. As described above, the specialized processor 900 may therefore configure two or more processing units to process respective portions of the file. In another example, the primitive may involve two different types of computations (i.e., subprimitives). As such, the specialized processor 900 may configure two processing units to perform the two different types of computations in parallel, sequentially, and/or based upon one or more conditions.

If a primitive specified using an API interface includes one or more subprimitives, the resource manager of a computing system (e.g., a resource manager 110, 210, or 310 as shown in FIGS. 1-3) may load a subprimitive onto one or more specialized processors and/or initiate execution of a subprimitive independently of a general purpose processor executing a software application using the primitive. The resource manager may load the subprimitive at any suitable time, as described above. In another embodiment, the general processor 204 may, given the specific primitive API call, pre-load the primitive chain information for any and all specialized processor(s) 900 participating in the execution of the API request.

FURTHER DESCRIPTION OF SOME EMBODIMENTS

Embodiments have been described in which a computing system 100 includes one or more reconfigurable computing module(s) 102 configurable to perform primitive tasks and a resource manager 110 adapted to manage the computing system's resources. In some embodiments, a computing module may be implemented using any suitable processing device, including, without limitation, an application-specific integrated circuit (ASIC), application-specific instruction-set processor (ASIP), digital signal processor (DSP), physics processing unit (PPU), graphics processing unit (GPU), network processor (NP), general-purpose programmable processor (e.g., CPU), microprocessor, microcontroller, multi-core processor, and/or any other device suitable for performing the specified primitive tasks. In some embodiments, a computing system may include at least one ASIC adapted to perform a searching primitive, at least one ASIC adapted to perform a counting primitive, and/or at least one ASIC adapted to perform a sorting primitive.

Embodiments have been described in which a reconfigurable computing system uses a hardware-based storage node manager to manage communication between one or more reconfigurable computing modules and one or more storage nodes. However, use of the hardware-based storage node manager is not limited to reconfigurable computing systems. In some embodiments, a hardware-based storage node manager may be used to manage communication between a storage node and any suitable processing device (e.g., an ASIC adapted to perform a primitive task).

Embodiments have been described in which a hardware-based storage node manager is implemented, at least in part, using reconfigurable hardware (e.g., one or more FPGAs). However, implementations of the hardware-based storage node manager are not limited to reconfigurable hardware. In some embodiments, a hardware-based storage node manager may be implemented without using reconfigurable hardware. In some embodiments, a hardware-based storage node manager may be implemented, at least in part, using one or more ASICs and/or any other suitable processing device.

Embodiments have been described in which a processing unit of a specialized processor (e.g., a reconfigurable partition of an RCM) is configured to implement one or more primitives. In some embodiments, multiple processing units may be configured to implement a single primitive.

Embodiments have been described in which "storage" includes non-volatile memory. In some embodiments, "storage" may include volatile memory.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

TERMINOLOGY

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A method of configuring one or more field programmable gate array (FPGA) modules for executing a primitive, the method comprising the steps of:

receiving at an FPGA-based controller an identifier of a primitive; and
using the FPGA-based controller to:
identify a plurality of FPGA units available for implementing the primitive;
select a plurality of subprimitives related to the primitive based, at least in part, on at least one of: (i) a primitive parameter and (ii) a system parameter, the plurality of subprimitives comprising a first subprimitive and a second subprimitive;
configure a first FPGA unit of the plurality of available FPGA units for executing the first subprimitive;
configure a second FPGA unit of the plurality of available FPGA units for executing the second subprimitive; and
configure at least a portion of an interconnect to coordinate the execution of the first subprimitive and the execution of the second subprimitive, the coordination comprising at least one of: (i) passing a result from the first FPGA unit to the second FPGA unit, and (ii) transmitting results from at least one of the first and second FPGA units to a memory unit.

2. The method of claim 1, wherein:
the execution of the first subprimitive comprises accessing a first data element; and
the execution of the second subprimitive comprises accessing a second data element different from the first data element.

3. The method of claim 2, wherein the second subprimitive comprises the first subprimitive.

4. The method of claim 2, wherein:
the first data element is local to the first FPGA unit; and
the second data element is local to the second FPGA unit.

5. The method of claim 1, wherein the first and the second FPGA units are configured to execute, at least partially in parallel, the first subprimitive and the second subprimitive.

6. The method of claim 1, wherein the first FPGA unit and the second FPGA unit are configured to sequentially execute the first subprimitive and the second subprimitive.

7. The method of claim 1, wherein:
the first FPGA unit is configured for using a first data element to generate an intermediate result; and
the second FPGA unit is configured for executing the second subprimitive using at least one of a second data element and the intermediate result.

8. The method of claim 7, further comprising the step of:
providing an FPGA-based storage node manager configured to store the intermediate result in a storage module and to read the intermediate result from the storage module,
wherein the first and second FPGA units are configured to access the intermediate result via the FPGA-based storage node manager.

9. The method of claim 1, further comprising configuring by the FPGA-based controller:
a third FPGA unit included in the plurality of available FPGA units to execute, using a third data element, a third subprimitive related to the primitive, wherein the plurality of subprimitives further includes the third subprimitive.

10. The method of claim 9, wherein the configuration of the third FPGA unit by the FPGA-based controller is based on, at least in part, a size of data associated with the primitive.

11. The method of claim 9, wherein the first FPGA unit is configured for generating an intermediate result, the method further comprising configuring by the FPGA-based controller:
activation of either the second FPGA unit or the third FPGA unit, based on, at least in part, the intermediate result.

12. The method of claim 1, wherein the one or more FPGA modules comprise:
a first FPGA module comprising the first FPGA unit; and
a second FPGA module comprising the second FPGA unit.

13. The method of claim 1, wherein:
the one or more FPGA modules comprise a first FPGA module comprising both a first FPGA processor and a second FPGA processor, and wherein:
the first FPGA processor comprises the first FPGA unit; and
the second FPGA processor comprises the second FPGA unit.

14. The method of claim 1, wherein the one or more FPGA modules comprise a first FPGA processor comprising both the first FPGA unit and the second FPGA unit.

15. The method of claim 1, further comprising, using the FPGA-based controller to:
configure all of the plurality of available FPGA units to execute a respective subprimitive selected from a first subset of the plurality of subprimitives such that the first FPGA unit is configured to execute the first subprimitive and the second FPGA unit is configured to execute the second subprimitive;
configure at least another portion of the interconnect to coordinate the execution of all of the first subset of the plurality of subprimitives in at least one of parallel, sequential, and conditional manner;
reconfigure all of the plurality of available FPGA units to execute a respective subprimitive selected from a second subset of the plurality of subprimitives related to the primitive; and
reconfigure at least the other portion of the interconnect to coordinate the execution of all of the second subset of the plurality of subprimitives in at least one of parallel, sequential, and conditional manner.

16. The method of claim 1, wherein an intermediate subprimitive is related to the primitive, the method further comprising:
deriving by the FPGA-based controller the first and second subprimitives from the intermediate subprimitive, based on at least one of a primitive parameter and a system parameter.

17. A system for executing a primitive, the system comprising:
first and second FPGA units;
an interconnect; and
an FPGA-based controller configured to:
receive an identifier of a primitive,
identify a plurality of FPGA units available for implementing the primitive, the plurality of available FPGA units comprising the first and second FPGA units,
select a plurality of subprimitives related to the primitive based, at least in part, on at least one of: (i) a primitive parameter and (ii) a system parameter, the plurality of subprimitives comprising a first subprimitive and a second subprimitive,
configure the first FPGA unit to execute the first subprimitive,
configure the second FPGA unit to execute the second subprimitive, and
configure at least a portion of the interconnect to coordinate the execution of the first subprimitive and the second subprimitive, the coordination comprising at least one of: (i) passing a result from the first FPGA unit to the second FPGA unit, and (ii) transmitting results from at least one of the first and second FPGA units to a memory unit.

18. The system of claim 17, wherein:
execution of the first subprimitive comprises the first FPGA unit accessing a first data element; and
execution of the second subprimitive comprises the second FPGA unit accessing a second data element different from the first data element.

19. The system of claim 18, wherein the second subprimitive comprises the first subprimitive.

20. The system of claim 18, wherein:
the first data element is local to the first FPGA unit; and
the second data element is local to the second FPGA unit.

21. The system of claim 17, wherein the first and the second FPGA units are configured to execute, at least partially in parallel, the first subprimitive and the second subprimitive.

22. The system of claim 17, wherein the first FPGA unit and the second FPGA unit are configured to sequentially execute the first subprimitive and the second subprimitive.

23. The system of claim 17, wherein:
the first FPGA unit is configured to use a first data element to generate an intermediate result; and
the second FPGA unit is configured to execute the second subprimitive using at least one of a second data element and the intermediate result.

24. The system of claim 23, further comprising an FPGA-based storage node manager configured to store the intermediate result in a storage module and to read the intermediate result from the storage module, wherein the first and second FPGA units are configured to access the intermediate result via the FPGA-based storage node manager.

25. The system of claim 17, further comprising a third FPGA unit included in the plurality of available FPGA units, wherein the FPGA-based controller is further configured to configure the third FPGA unit to execute, using a third data element, a third subprimitive related to the primitive.

26. The system of claim 25, wherein the configuration of the third FPGA unit by the FPGA-based controller is based on, at least in part, a size of data associated with the primitive.

27. The system of claim 25, wherein the first FPGA unit is configured to generate an intermediate result, and wherein the FPGA-based controller is further configured to control activation of either the second FPGA unit or the third FPGA unit, based on, at least in part, the intermediate result.

28. The system of claim 17, wherein the FPGA-based controller is further configured to:
configure all of the plurality of FPGA units to execute a respective subprimitive selected from a first subset of the plurality of subprimitives such that the first FPGA unit is configured to execute the first subprimitive and the second FPGA unit is configured to execute the second subprimitive;
configure at least another portion of the interconnect to coordinate the execution of all of the first subset of the plurality of subprimitives in at least one of parallel, sequential, and conditional manner;
reconfigure all of the plurality of FPGA units to execute a respective subprimitive selected from a second subset of the plurality of subprimitives; and
reconfigure at least the other portion of the interconnect to coordinate the execution of all of the second subset of the plurality of subprimitives in at least one of parallel, sequential, and conditional manner.

29. The system of claim 17, wherein:
an intermediate subprimitive is related to the primitive; and
the FPGA-based controller is further configured to derive the first and second subprimitives from the intermediate subprimitive, based on at least one of a primitive parameter and a system parameter.

30. The system of claim 17, wherein configuring at least the portion of the interconnect to coordinate the execution of the first subprimitive and the second primitive comprises selectively configuring at least the portion of the interconnect for at least one type of data flow selected from the group consisting of parallel data flow between a storage node manager and the first and second FPGA units, sequential data flow between the first and second FPGA units, and conditional data flow between the first and second FPGA units, and wherein the selectively configuring is based, at least in part, on a relationship between the first and second subprimitives.

* * * * *